US010462204B2

(12) United States Patent
Won

(10) Patent No.: US 10,462,204 B2
(45) Date of Patent: Oct. 29, 2019

(54) METHOD AND SYSTEM FOR TRANSMITTING IMAGE BY USING STYLUS, AND METHOD AND ELECTRONIC DEVICE THEREFOR

(71) Applicant: Samsung Electronics Co. Ltd., Suwon-si, Gyeonggi-do (KR)

(72) Inventor: Sung-Joon Won, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1160 days.

(21) Appl. No.: 14/041,408

(22) Filed: Sep. 30, 2013

(65) Prior Publication Data

US 2014/0095659 A1  Apr. 3, 2014

(30) Foreign Application Priority Data

Sep. 28, 2012 (KR) .................. 10-2012-0108706

(51) Int. Cl.
*H04L 29/08* (2006.01)
(52) U.S. Cl.
CPC .............. *H04L 67/02* (2013.01); *H04L 67/06* (2013.01); *H04L 67/36* (2013.01)
(58) Field of Classification Search
CPC ......... H04L 67/02; H04L 67/06; H04L 67/36; G06F 9/5038; G06F 11/28; G06F 13/1621
See application file for complete search history.

(56) References Cited

U.S. PATENT DOCUMENTS

| | | | |
|---|---|---|---|
| 6,088,721 A * | 7/2000 | Lin | H04L 67/06 709/213 |
| 6,563,494 B1 | 5/2003 | Eichstaedt et al. | |
| 6,678,502 B1 * | 1/2004 | Sugaya | H04L 1/0041 370/338 |
| 7,599,562 B2 | 10/2009 | Liu | |
| 2003/0046032 A1 * | 3/2003 | Puthiyedath | H04L 29/06027 702/188 |
| 2003/0120802 A1 * | 6/2003 | Kohno | H04L 29/06 709/237 |
| 2003/0161003 A1 * | 8/2003 | Herbert | H04N 1/00132 358/1.18 |
| 2006/0111172 A1 * | 5/2006 | Walker | G07F 17/32 463/16 |
| 2006/0211470 A1 * | 9/2006 | Walker | G07F 17/32 463/16 |
| 2007/0165912 A1 * | 7/2007 | Liu | G06F 3/03545 382/120 |

(Continued)

*Primary Examiner* — Lance Leonard Barry
(74) *Attorney, Agent, or Firm* — Jefferson IP Law, LLP

(57) ABSTRACT

A method and a system for transmitting data are provided. The method comprises generating information about each of the at least one data corresponding to selection of the at least one data displayed on a first touch screen by the first electronic device, transmitting the information to a stylus for transmitting the image from the first electronic device to a second electronic device via the stylus, and directly transmitting the image from the first electronic device to the second electronic device by the request of the second electronic device, and storing the information transmitting the information to the second electronic device by the stylus. The information includes at least one session Identifier (ID) indicating a selected order of the at least one data and a device ID of the first electronic device.

14 Claims, 12 Drawing Sheets

(56) References Cited

U.S. PATENT DOCUMENTS

| | | | | |
|---|---|---|---|---|
| 2009/0138513 | A1* | 5/2009 | Wen | H04L 65/4084 |
| 2010/0091801 | A1* | 4/2010 | Itakura | H04L 1/1657 370/475 |
| 2011/0021250 | A1* | 1/2011 | Ickman | G06F 17/30867 455/566 |
| 2013/0032634 | A1* | 2/2013 | McKirdy | G06Q 30/0271 235/375 |
| 2013/0042326 | A1* | 2/2013 | Matus | G06F 21/34 726/28 |
| 2013/0106782 | A1* | 5/2013 | Nowatzyk | G06F 3/03545 345/175 |
| 2013/0304815 | A1* | 11/2013 | Puente | H04L 67/10 709/204 |
| 2014/0282106 | A1* | 9/2014 | Smith | G06F 3/0488 715/753 |
| 2014/0292720 | A1* | 10/2014 | Liang | H04L 67/06 345/174 |

\* cited by examiner

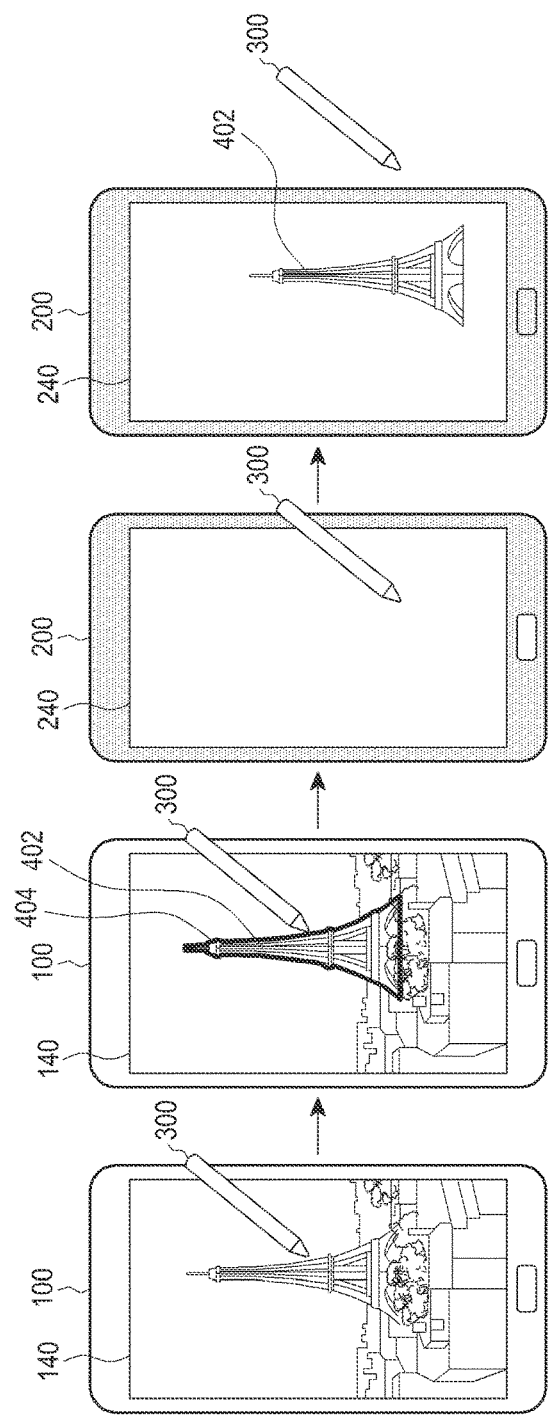

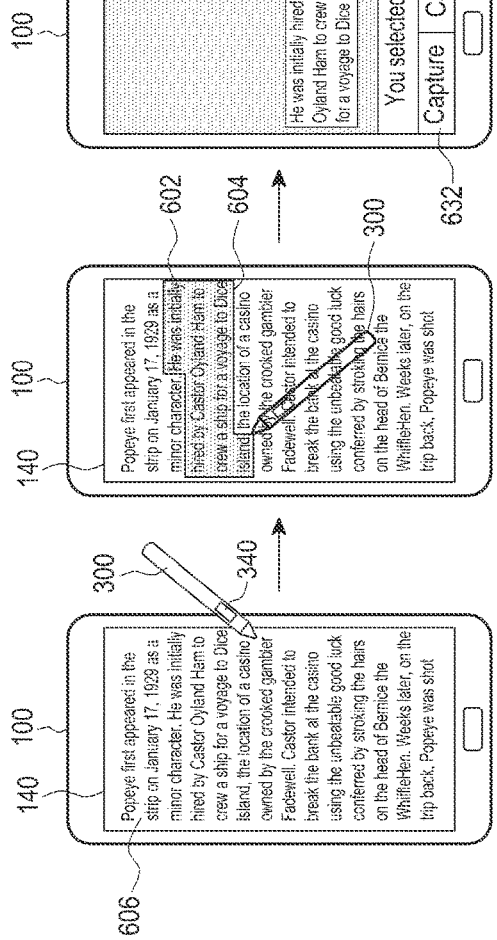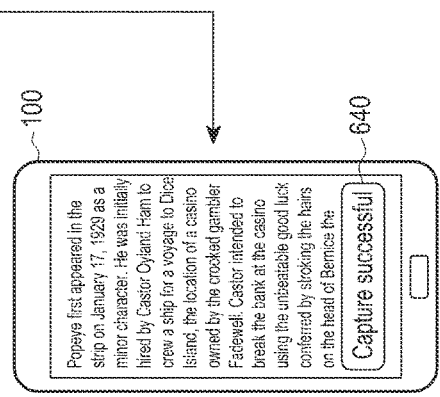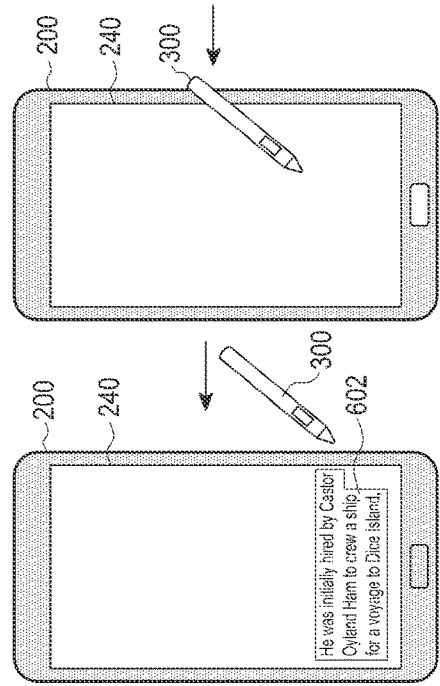

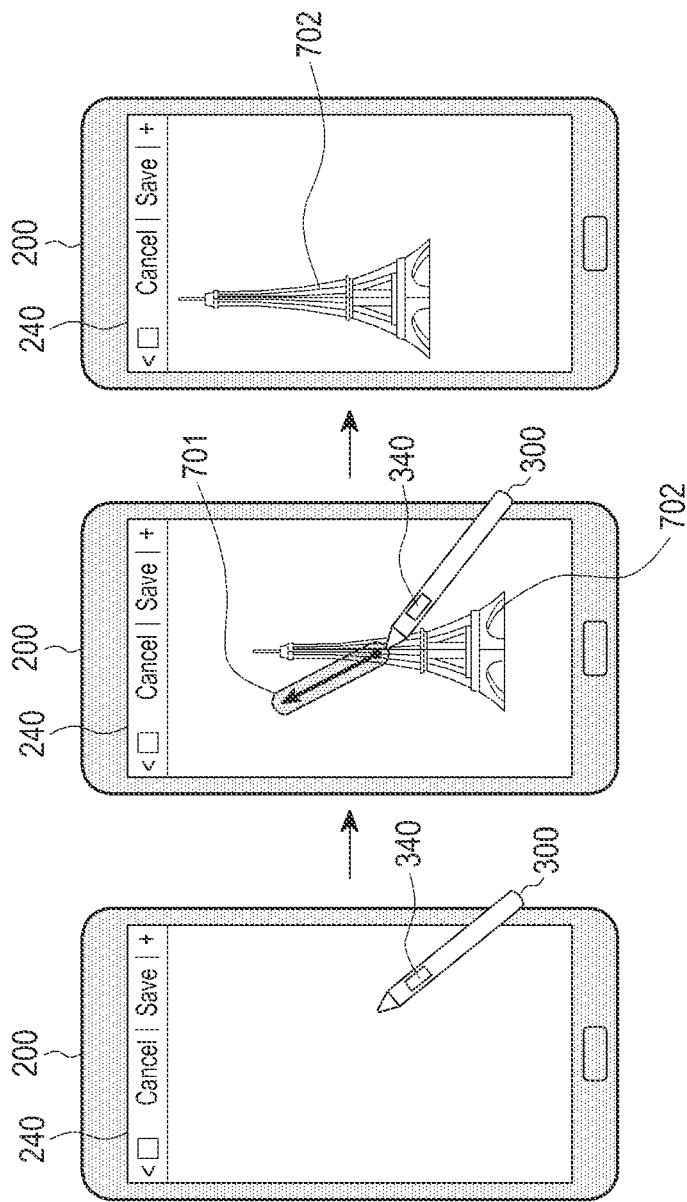

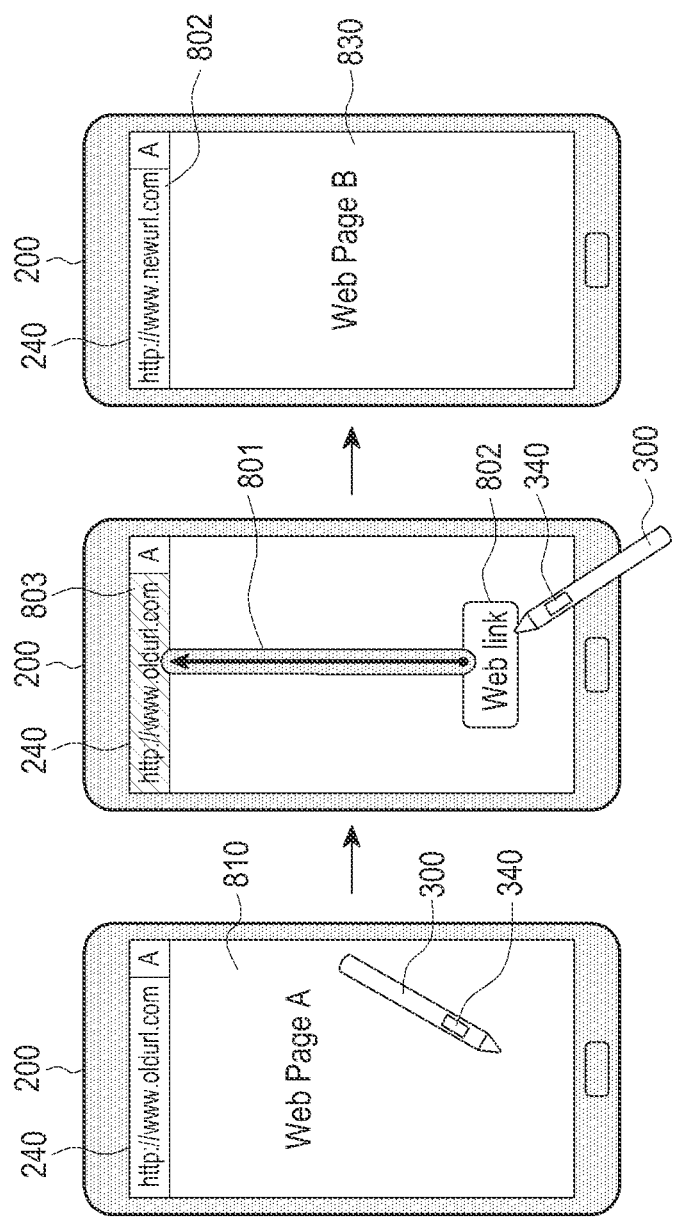

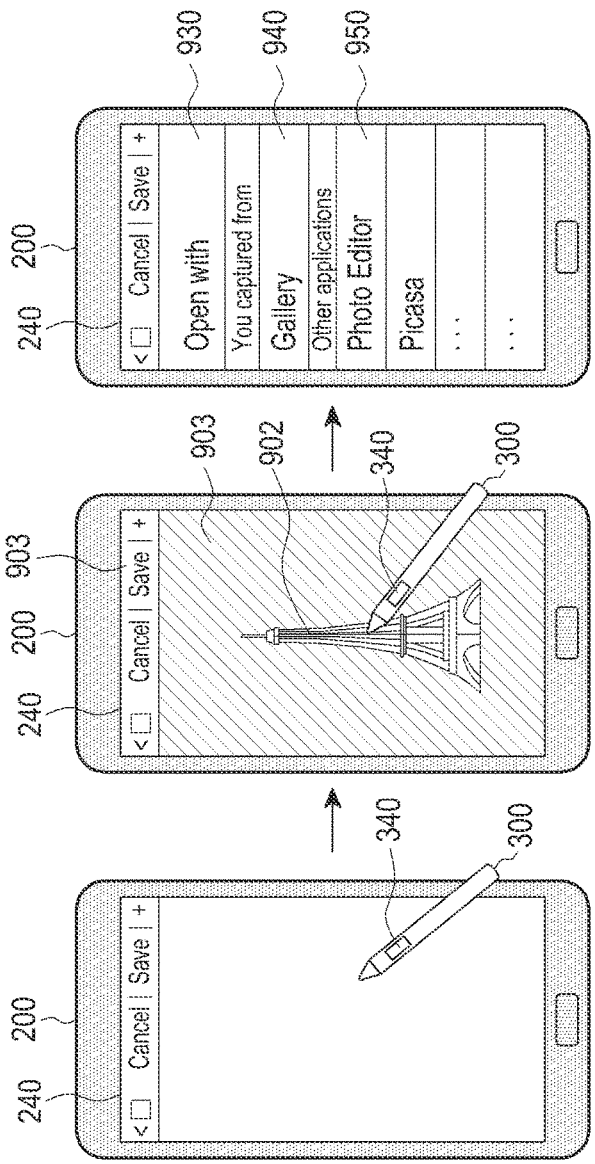

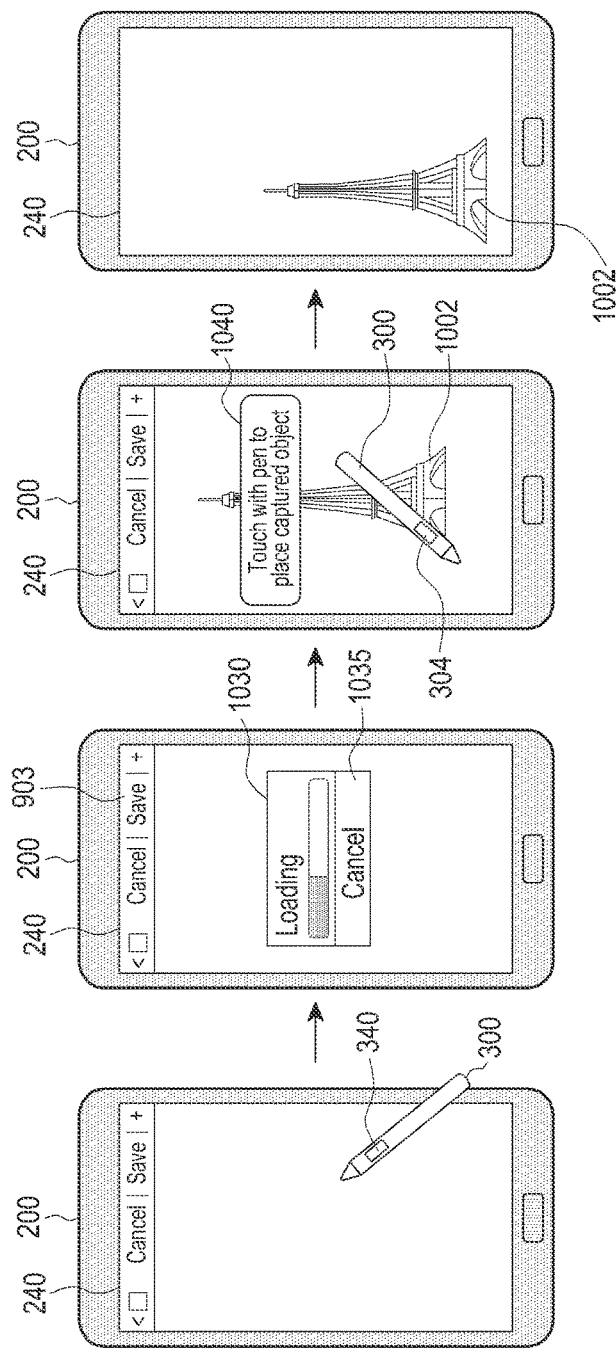

METHOD AND SYSTEM FOR TRANSMITTING IMAGE BY USING STYLUS, AND METHOD AND ELECTRONIC DEVICE THEREFOR

PRIORITY

This application claims the benefit under 35 U.S.C. § 119(a) of a Korean patent application filed on Sep. 28, 2012 in the Korean Intellectual Property Office and assigned Serial No. 10-2012-0108706, the entire disclosure of which is hereby incorporated by reference.

BACKGROUND OF THE INVENTION

1. Field of the Invention

The present disclosure relates to a method and system for transmitting data, and method and electronic device therefor. More particularly, the present disclosure relates to a method and system for facilitating data transmission between electronic devices through communication.

2. Description of the Related Art

Data transmission between electronic devices uses a technology of transmitting data such as an image and text between electronic devices. Transmission of an image, text or the like between desktop Personal Computers (PCs) over a wired network is an example of the data transmission technology between electronic devices.

According to the related art, transmission data should be selected using input means such as a keyboard, a mouse, or the like when, for example, a desktop PC is being used, for example. Moreover, when the transmission data is input, the data should be extracted from a memory and thereafter input using the input means after the desktop PC determines whether the data can be input to an input area. Such a process of data transmission according to the related art is inconvenient.

The past few years have witnessed a rapid growth of portable terminals based on touch screen and wireless communication technologies. Accordingly, there exists a need for developing a technique for increasing user convenience and the efficiency of data transmission using a touch screen in the inter-electronic device data transmission technology.

Therefore, a need exists for a system and method for facilitating data transmission between electronic devices.

The above information is presented as background information only to assist with an understanding of the present disclosure. No determination has been made, and no assertion is made, as to whether any of the above might be applicable as prior art with regard to the present disclosure.

SUMMARY OF THE INVENTION

The present disclosure are to address at least the above-mentioned problems and/or disadvantages and to provide at least the advantages described below. Accordingly, an aspect of the present invention is to provide a method and system for facilitating data transmission between electronic devices.

Also, the present disclosure is to provide a method and apparatus for transmitting data between electronic devices using a data transmission object.

In accordance with an aspect of the present invention, a method for transmitting data is provided. The method comprises generating information about each of at least one data corresponding to selection of the at least one data displayed on a first touch screen by the first electronic device, transmitting the information to a data transmission object by the first electronic device, and storing the information and transmitting the information to a second electronic device by the data transmission object. The information includes at least one session identifier indicating a selected order of the at least one data and an identifier of the first electronic device.

In accordance with another aspect of the present invention, a data transmission system is provided. The system comprises a first electronic device includes a first touch screen for displaying at least one data, a first controller for generating information about each of the at least data corresponding to selection of the at least one data and for storing the information in a first memory, and a first communication module for transmitting the information to a data transmission object, and the data transmission object includes a third communication module for receiving the information and for transmitting the information to a second electronic device, a third memory for storing the received information, and a third controller for controlling the third communication module and the third memory. The information includes at least one session identifier indicating a selected order of the at least one data and an identifier of the first electronic device.

In accordance with another aspect of the present invention, an electronic device is provided. The electronic device comprises a touch screen for displaying at least one of data, a controller for generating information corresponding to selection of the at least one data displayed on the touch screen, and a communication module for transmitting the generated information to a data transmission object. The controller transmits, on receiving a request for requesting transmission of the at least one of data corresponding to the generated information from another electronic device, the requested at least one of data to the another electronic device.

In accordance with another aspect of the present invention, a method for transmitting data is provided. The method comprises displaying at least one of data, generating information corresponding to selection of the at least one data displayed on the touch screen, transmitting the generated information to a data transmission object, and on receiving a request for requesting transmission of the at least one of data corresponding to the generated information from another electronic device, transmitting the requested at least one of data to the another electronic device.

Other aspects, advantages, and salient features of the present disclosure will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 4A, 4B, 4C, and 4D are diagrams illustrating an exemplary embodiment of the present invention;

FIGS. 6A, 6B, 6C, 6D, 6E, and 6F are diagrams illustrating an exemplary embodiment of the present invention;

FIGS. 7A, 7B, and 7C are diagrams illustrating an exemplary embodiment of the present invention;

FIGS. 8A, 8B, and 8C are diagrams illustrating an exemplary embodiment of the present invention;

FIGS. 9A, 9B, and 9C are diagrams illustrating an exemplary embodiment of the present invention;

FIGS. 10A, 10B, 10C, and 10D are diagrams illustrating an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
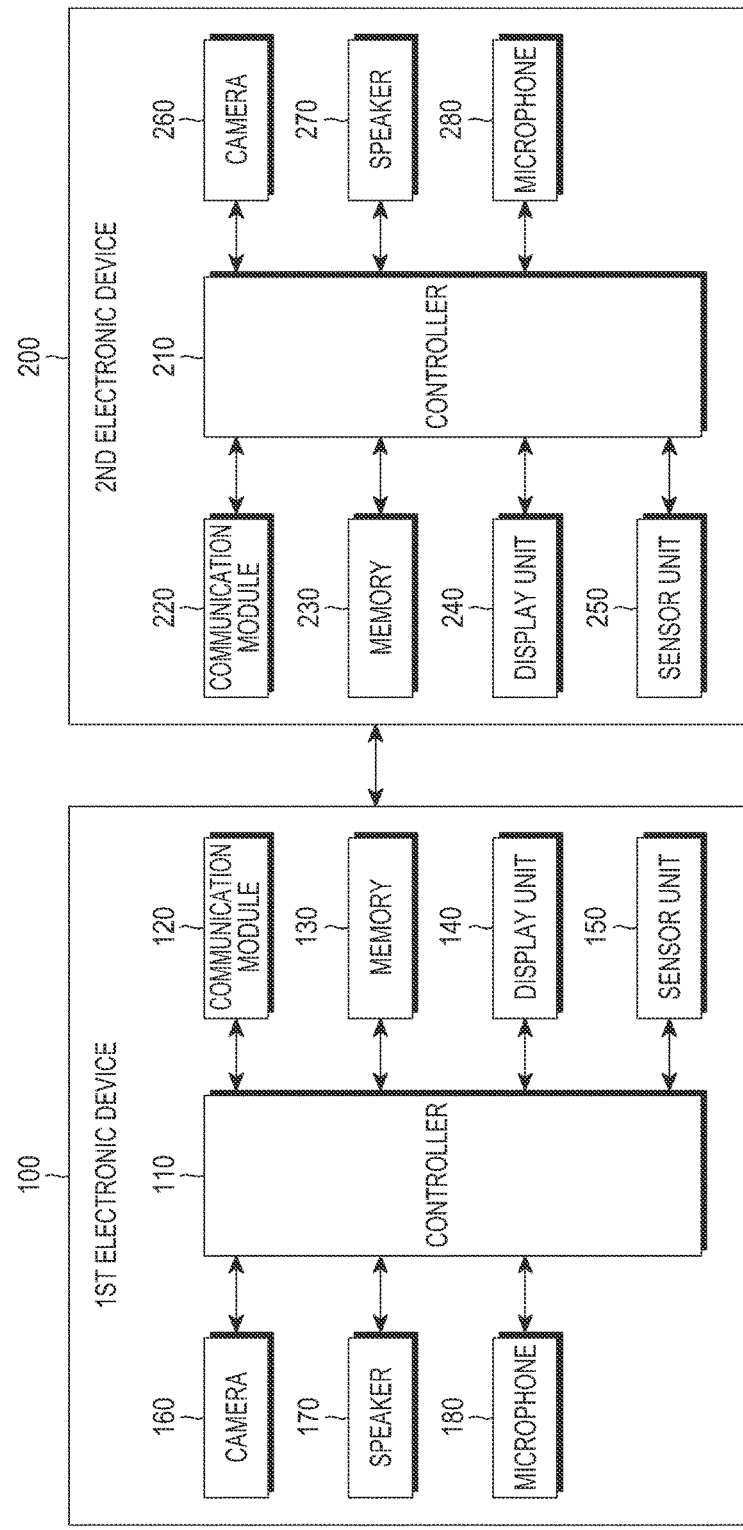
FIG. 1 is a block diagram of a data transmission system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While ordinal numbers like first, second, and the like can be used to describe a number of components, such components are not limited by the terms. The ordinal numbers are used to distinguish one component from another components. For example, a first component may be referred to as a second component or vice versa within the scope and spirit of exemplary embodiments of the present invention. The term 'and/or' means inclusion of a combination of a plurality of described associated items or one of the items.

The technical terms used in the description of exemplary embodiments of the present invention are provided simply to describe specific exemplary embodiments of the present invention, and are not intended to restrict the present invention. Herein, singular expressions include plural expressions unless otherwise clarified in the context. In this description, the term 'include' or 'have' is not interpreted as necessarily including all of the features, numbers, steps, operations, components, parts, or a combination thereof described in the specification. Rather, it should be understood that there are possibilities of omitting or adding one or more features, numbers, steps, operations, components, parts, or combinations thereof.

Unless otherwise defined, all the terms used herein including technical or scientific terms have the same meaning as terms generally understood by those skilled in the art. In addition, terms defined in a general dictionary should be understood so as to have the same meanings as contextual meanings of the related art. Unless expressly defined in describing exemplary embodiments of the present invention, the terms are not interpreted as ideal or excessively formal meanings.

FIG. 1 is a block diagram of a data transmission system according to an exemplary embodiment of the present invention.

Referring to FIG. 1, the data transmission system includes first and second electronic devices 100 and 200. Although the first electronic device 100 and the second electronic device (or another electronic device) 200 are shown in this example as having the same configuration, the first electronic device 100 and the second electronic device 20 may have different configurations. Further, although the following description focuses on the first electronic device 100, the same description is applicable to the second electronic device 200 and vice versa.

The first electronic device 100 may be any of a smart phone, a portable phone, a desktop Personal Computer (PC), a game console, a Television (TV) receiver, a display device, an in-vehicle head unit, a laptop computer, a tablet PC, a Personal Multimedia Player (PMP), a Personal Digital Assistant (PDA), and the like.

The first electronic device 100 may communicate with the second electronic device 200 or may perform an operation in interaction with the second electronic device 200. The first electronic device 100 may transmit data to the second electronic device 200 directly or through a network. According to exemplary embodiments of the present invention, the network may be, but not limited to, any of a Local Area Network (LAN), a Wireless LAN (WLAN), a Wide Area Network (WAN), the Internet, a Small Area Network (SAN), and the like.

The first electronic device 100 may include a first controller 110, a first communication module 120, a first memory 130, a first display unit 140, a first sensor unit 150, a first camera 160, a first speaker 170, and a first microphone 180.

The first communication module 120, which may communicate via a wired connection or a wireless connection, connects the first electronic device 100 to an external device directly or through a network. The first communication module 120 transmits data received from the first controller 110, the first memory 130, and the first camera 160 by cable or wirelessly, transmits data received via an external communication line or data received wirelessly to the first controller 110, or stores the received data in the first memory 130.

The first communication module 120 may include at least one of a mobile communication module, a WLAN module, and a short-range communication module according to the capabilities of the first electronic device 100.

The mobile communication module connects the first electronic device 100 to an external device by mobile communication through at least one antenna (not shown) under the control of the first controller 110. The mobile communication module exchanges data with or transmits or receives a unidirectional to or from a portable phone, a smart phone, a tablet PC, and the like that has a phone number or a network address input to the first electronic device 100, for voice call, video call, Short Message Service (SMS), Multimedia Messaging Service (MMS), and the like.

The WLAN module may be connected to the Internet under the control of the controller 110 in a place at which a wireless Access Point (AP) (not shown) is installed. The WLAN module supports the WLAN standard, IEEE802.11x of the Institute of Electrical and Electronics Engineers (IEEE).

The short-range communication module may wirelessly conduct short-range communication between the first electronic device 100 and an external device under the control of the controller 110. The short-range communication may conform to Bluetooth, Infrared Data Association (IrDA), Wireless Fidelity (Wi-Fi), Near Field Communication (NFC), and the like.

The first memory 130 may store images used to provide applications having a variety of functions such as video call, games, and the like and associated Graphical User Interfaces (GUIs), user information, text, finger print information/data, databases related to finger print-function mapping tables, background images (a menu screen, a standby screen, and the like) or operation programs needed to operate the first electronic device 100, and images captured by a camera. The first memory 130 may be a machine-readable medium. The term 'machine-readable medium' may be defined as a medium that provides data to a machine so that the machine may perform a specific function. The machine-readable medium may be a storage medium. The first memory 130 may include a non-volatile medium and a volatile medium. All such media may be capable of transmitting commands of a machine-readable type that can be read by a mechanical device. The first memory 130 may include a non-transitory storage medium.

The machine-readable media may include, but is not limited to, at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a flash EPROM.

The first display unit 140 may display an image corresponding to an image signal received from the first controller 110, while receiving user input data (e.g., user input information) and outputting the user input data to the first controller 110. The first display unit 149 may include a display such as a Liquid Crystal Display (LCD), an Organic Light Emitting Diode (OLED) display, or an LED display, and a touch panel above or under the display. The touch panel detects a user input. When a user presses or hovers over the surface (e.g., a screen) of the first display unit 140 with user input means (e.g., a finger, a stylus pen, and the like), the touch panel outputs a sensing signal (or a touch sensing signal) comprising information about an input position (or input coordinates) and/or an input state (mouse down, mouse up, mouse shift, and the like). For example, the user executes an application associated with an item by touching the item from among various available items displayed on the screen of the first display unit 140. The first display unit 140, which corresponds to means for receiving a user input, outputs screen data associated with an application such as a camera application, a video call application, and an Internet application. Although the first display unit 140 is shown as a touch screen in an exemplary embodiment of the present invention, the first display unit 140 may be configured into a general display unit. According to exemplary embodiments of the present invention, an image may be displayed wholly or partially on the screen of the first display unit 140. In addition, the user input means may be an example of a later-descried data transmission object.

The touch screen may provide GUIs corresponding to various services (e.g., call, data transmission, broadcasting, photo taking/video capturing, and the like) to the user. The touch screen may transmit user input data corresponding to at least one touch on a GUI to the first controller 110.

According to exemplary embodiments of present invention, the term 'touch' includes non-contact as well as contact with a user's body or touch input means. The touch screen may be implemented into a resistive, capacitive, infrared, or acoustic wave type.

According to exemplary embodiments of the present invention, hovering refers to positioning the user input means at a height from the touch panel without contacting the touch panel. The touch panel of the touch screen may detect hovering. Specifically, the touch panel may detect the placement of the user input means over the touch panel by exchanging electromagnetic signals with the user input means.

The touch screen may include at least two touch screen panels for respectively detecting touch or approach of the user's body and the touch input means so as to simultaneously receive inputs from the user's body and the touch input means. The at least two touch screen panels provide different output values to the first controller 110. The first controller 110 may differentiate the received values and thus distinguish the input from the user's body from the input from the touch input means. The touch screen panel that receives an input from the touch input means may be, for example, an ElectroMagnetic Radiation (EMR) pad. The EMR pad may provide an output value to the first controller 110 by transmitting an electromagnetic signal to and receiving an electromagnetic signal from a stylus pen. According to exemplary embodiments of the present invention, a data transmission object may be a stylus pen.

A first User Interface (UI) corresponds to means for receiving a user input or providing information to the user, including a plurality of buttons, a vibration motor, a connector, a keypad, and the like. Examples of the first UI may include, but are not limited to, a mouse, a trackball, a joy stick, and cursor directional keys, which may provide cursor control in order to control information communication with the first controller 110 and cursor movement on the first display unit 140.

The buttons may be formed on the front surface, a side surface, or the rear surface of the first electronic device 100, and may include a power/lock button (not shown), a volume button (not shown), a menu button, a home button, a back button, and a search button.

The vibration motor may convert an electrical signal to a mechanical vibration under the control of the first controller 110. For example, when the first electronic device 100 receives an incoming voice call from another device (not shown) in vibration mode, the vibration motor operates. One or more vibration motors may be mounted inside the first electronic device 100. The vibration motor may operate in response to a user's touch on the touch screen.

The connector may be used as an interface for connecting the first electronic device 100 to an external device or a power source (not shown). The connector may transmit data stored in the first memory 130 to the external device or receive data from the external device via a cable connected to the connector, under the control of the controller 110. Power may be supplied or a battery may be charged from the power source via the cable connected to the connector.

The keypad may receive a key input from the user to control the first electronic device 100. The keypad includes a physical keypad formed in the first electronic device 100 or a virtual keypad displayed on the touch screen.

The first sensor unit 150 includes at least one sensor for detecting a state of the first electronic device 100 (e.g., the location, bearing, heading, and movement of the first electronic device 100). For example, the first sensor unit 150 may include a proximity sensor for detecting whether the user is close to the first electronic device 100 or a motion sensor for detecting a motion of the first electronic device 100 (e.g., rotation, acceleration, deceleration or vibration of the first electronic device 100). The motion sensor may include an acceleration sensor, a gravity sensor, an impact sensor, a Global Positioning System (GPS) compass sensor, and the like. The first sensor unit 150 may detect a state of the first electronic device 100, generate a signal corresponding to the detected state, and transmit the generated signal to the first controller 110. For example, a GPS module may receive radio waves from a plurality of GPS satellites (not shown) in Earth orbit and calculate the position of the first electronic device 100 based on the Time of Arrival (ToA) of satellite signals from the GPS satellites to the first electronic device 100.

The first camera 160 includes a lens system, a driver, and an image sensor. The first camera 160 may further include a flash. The first camera 160 may convert an optical signal received from (or captured by) the lens system to an electrical image signal or data. The user may capture a video or a still image with the first camera 160. In other words, the first camera 160 forms an optical image of an object and detects the optical image as an electrical signal.

The lens system forms an image of the object by converging light incident from the outside. The lens system includes at least one lens which may be a convex lens, a non-spherical lens, and the like. The lens system has symmetry with respect to an optical axis extended through the center of the lens system. The optical axis is defined as the central axis. The image sensor detects an optical image formed by external light incident through the lens system as an electrical image signal.

The image sensor has a plurality of pixels arranged in an M×N matrix. Each of the pixels may include a photodiode and at least one transistor. The pixels accumulate potentials generated by incident light (i.e., exposure). The voltages of the accumulated potentials represent the intensities of the incident light (i.e., output of image data). In processing a video frame of a still image or video, image data output from the image sensor is a set of voltages output from the pixels (i.e., pixel values). The image data represents one image (i.e., a still image). In addition, the image includes M×N pixels. A Charge-Coupled Device (CCD) image sensor, a Complementary Metal-Oxide Semiconductor (CMOS) image sensor, or the like is available as the image sensor.

The driver drives the image sensor under the control of the first controller 110. The driver exposes all or an interested part of the pixels of the image sensor according to a control signal received from the first controller 110, and outputs image data from the exposed pixels to the first controller 110.

The first speaker 170 may output sounds corresponding to various signals (e.g., a wireless signal, a broadcast signal, a digital audio file, a digital video file, a photo shot, and the like) to the outside of the first electronic device 100 under the control of the first controller 110. The first speaker 170 may output sounds corresponding to functions performed by the first electronic device 100. One or more first speaker 170 may be formed at a corresponding appropriate position of the first electronic device 110.

For the input of voice or sound received from the outside of the first electronic device 100, the first microphone 180 generates an electrical signal.

The first controller 110 executes an application according to user input data. The application executes a program according to the user input data. The user input includes an input from at least one of the keypad, the touch screen, and a camera-based input. The first controller 110 may include a bus for information communication and a processor connected to the bus, for processing information. The first controller 110 may include an additional memory (e.g., a RAM) connected to the bus, for storing information required for the processor. The additional memory may be used to store temporary information required for the processor. The first electronic device 100 may further include a Read-Only Memory (ROM) connected to the bus, for storing static information required for the processor. The first controller 110 as a Central Processing Unit (CPU) provides overall control to the first electronic device 100 and performs a data transmission method of the present invention. The first controller 110 processes an image received from the first camera 160 or an image stored in the first memory 130 on a frame-by-frame basis and outputs a video frame converted to match the screen features (size, video quality, resolution, and the like) of the first display unit 140.

The second electronic device (or another electronic device) 200 may include a second controller 210, a second communication module 220, a second memory 230, a second display unit 240, a second sensor unit 250, a second camera 260, a second speaker 270, and a second microphone 280. The components of the second electronic device 200 are similar to the corresponding components of the first electronic device 100 in configuration and operation.

Figure 2:
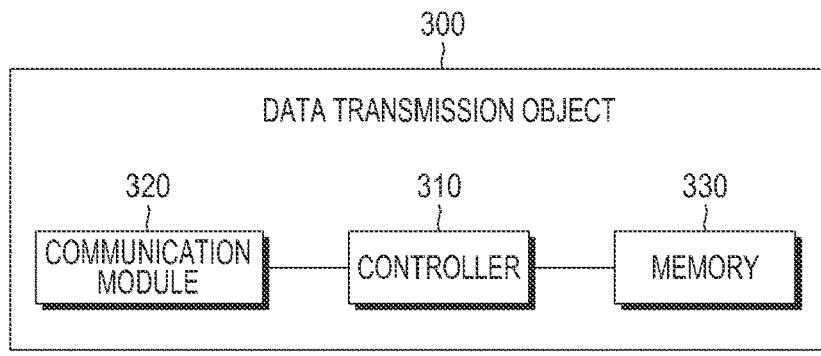
FIG. 2 is a block diagram of a data transmission object according to an exemplary embodiment of the present invention.

FIG. 2 is a block diagram of a data transmission object according to an exemplary embodiment of the present invention.

Referring to FIG. 2, the data transmission object 300 may include a third controller 310, a third communication module 320, and a third memory 330.

The data transmission object 300 may transmit data to the first and second electronic devices 100 and 300 via a direct connection or through a network. The network may be, but is not limited to, a LAN, a WLAN, a WAN, the Internet, or a SAN.

The third controller 310 as a CPU provides overall control to the data transmission object 300 and performs a data transmission method according to exemplary embodiments of the present invention. The third controller 310 also controls the third communication module 320 and the third memory 330.

The third communication module 320, which may communicate via a wired connection or a wireless connection, connects the data transmission object 300 to an external device directly or through the network. The third communication module 320 transmits data received from the third memory 330 by cable or wirelessly, transmits data received via an external communication line or data received wirelessly to the third controller 310, or stores the received data in the third memory 330.

The third communication module 320 may include at least one of a mobile communication module, a WLAN module, and a short-range communication module according to the capabilities of the data transmission object 300.

The mobile communication module exchanges data with or transmits or receives a unidirectional to or from a portable phone, a smart phone, a tablet PC, and the like that has a phone number or a network address input to the data transmission object 300, for voice call, video call, SMS, MMS, and the like.

The WLAN module may be connected to the Internet under the control of the third controller 310 in a place at which a wireless AP (not shown) is installed. The WLAN module supports the WLAN standard, IEEE802.11x of the IEEE.

The short-range communication module may conduct short-range wireless communication between the data transmission object 300 and an external electronic device (e.g., the first or second electronic device 100 or 200) under the control of the third controller 310. The short-range communication may conform to Bluetooth, IrDA, Wi-Fi, NFC, and the like.

The third memory 330 may store images used to provide applications having a variety of functions such as video call, games, and the like and associated GUIs, user information, text, finger print information/date, databases related to mapping tables that map finger prints to functions, background images (a menu screen, a standby screen, and the like) or operation programs needed to operate the data transmission object 300, and images captured by a camera. The third memory 330 may be a machine-readable medium. The term 'machine-readable medium' may be defined as a medium that provides data to a machine so that the machine may perform a specific function. The machine-readable medium may be a storage medium. The third memory 330 may include a non-volatile medium and a volatile medium. All such media may be capable of transmitting commands of a machine-readable type that can be read by a mechanical device. The third memory 330 may include a non-transitory storage medium.

The machine-readable media may include, but is not limited to, at least one of a floppy disk, a flexible disk, a hard disk, a magnetic tape, a CD-ROM, an optical disk, a punch card, a paper tape, a RAM, a PROM, an EPROM, and a flash EPROM.

A third UI corresponds to means for receiving a user input or providing information to the user, including a plurality of buttons and a connector, and the like.

A button may be formed on the front surface, a side surface, or the rear surface of the data transmission object 300.

The connector may be used as an interface for connecting the data transmission object 300 to an external device or a power source (not shown). The connector may transmit data stored in the third memory 330 to the external device via a cable connected to the connector or may receive data from the external device, under the control of the third controller 310. Power may be supplied or a battery may be charged from the power source via the cable connected to the connector.

It should be understood in the following description that performing an operation in each electronic device corresponds to performing the operation by controlling other components at the controller of the electronic device. Data generated in each electronic device or external input data may be stored in the memory of the electronic device. It should be understood from the description of the operation of each component in each electronic device that an operation performed by the controller may be performed using an associated component. For example, it should be understood that a communication module is used for communication with an external device, a display is used to display data, a camera is used to capture an object, and a sensor unit is used to detect an event or an environment.

Figure 3:
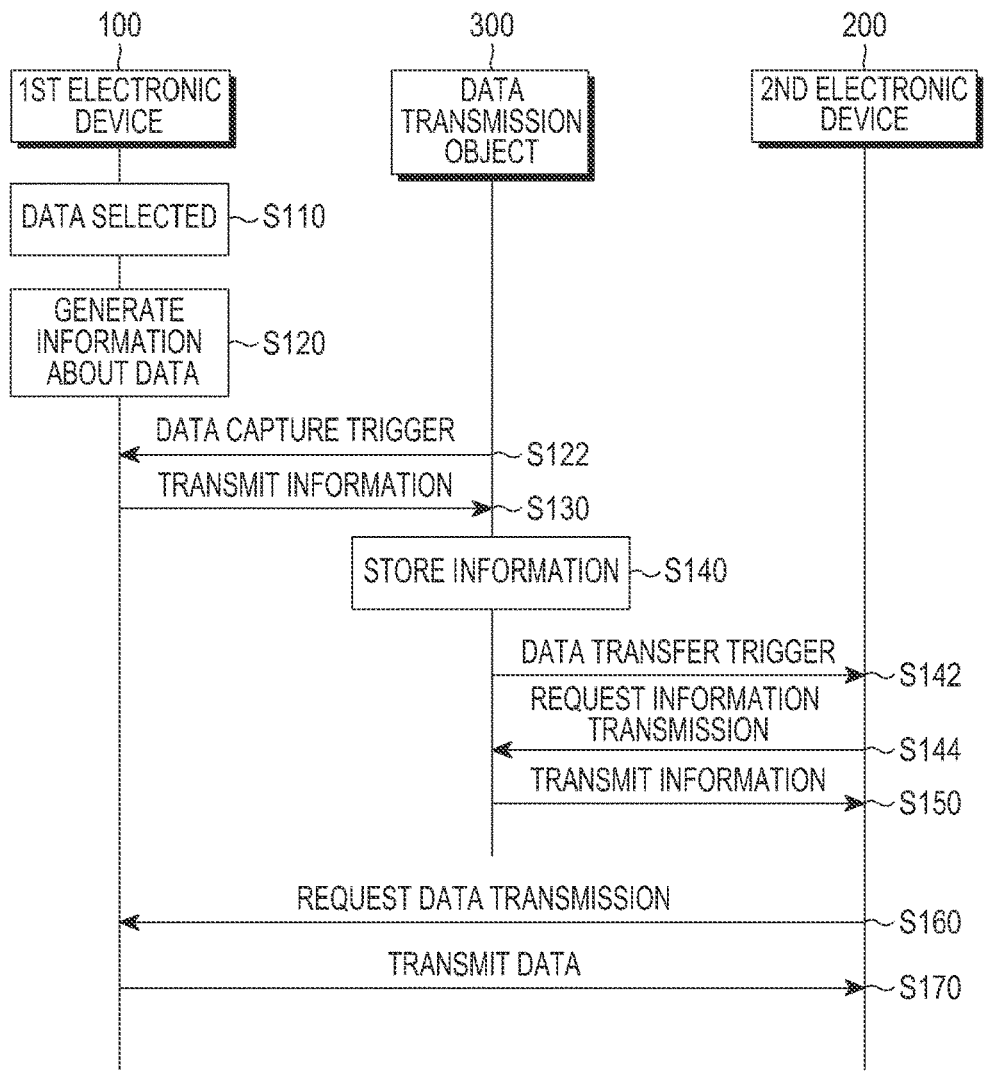
FIG. 3 is a diagram illustrating a signal flow for a data transmission method according to an exemplary embodiment of the present invention.

FIG. 3 is a diagram illustrating a signal flow for a data transmission method according to an exemplary embodiment of the present invention.

Referring to FIG. 3, at least one data is selected from among data displayed on the first touch screen 140 of the first electronic device 100 in step S110. At least one data may be displayed on the first touch screen 140 of the first electronic device 100.

The at least one data may cover various types of data that can be displayed on the first touch screen 140. The at least one data may include at least one of an image, text, an audio file, a video file, a Uniform Resource Locator (URL), a screen shot, a contact, an event, a task, a memo, a note, an application icon, a map view, and the like which should not be construed as limiting exemplary embodiments of the present invention.

The at least one data may be selected from the first touch screen 140 of the first electronic device 100, for example, by touching or hovering over the at least one data. Specifically, upon detection of a touch on or hovering over the at least one data by user input means (e.g., a user's finger or a stylus pen), the first controller 110 may recognize selection of the at least one data. Upon detection of a touch on or hovering over the at least one data by the data transmission object 300, the first controller 110 may also recognize selection of the at least one data. A guideline or edit cursor may be displayed on the at least one data displayed on the first display unit 140. The guideline or edit cursor may be a mark drawn around the at least one data. The size of the guideline or edit cursor may be changed. In addition, the size of the selected at least one data may be changed by changing the size of the guideline or edit cursor. The size of the guideline or edit cursor may be changed by touching or dragging the guideline or edit cursor using the user input means. For example, the first controller 110 may detect the touch or dragging of the guideline or edit cursor using the user input means and thus may change the size of the guideline or edit cursor according to the touch or drag. In addition, the size of the guideline or edit cursor may be changed by touching or dragging the guideline or edit cursor using the data transmission object 300. For example, the first controller 110 may detect the touch or dragging of the guideline or edit cursor using the data transmission object 300 and may change the size of the guideline or edit cursor according to the touch or drag. The first controller 110 may store the selected at least one data in the first memory 130.

Subsequently, the first electronic device generates information about the at least one data in step S120. Specifically, the first controller 110 of the first electronic device 100 may generate information about each of the at least one data selected in step S110. The generated information may include content corresponding to the at least one data. The generated information may be smaller in size than the at least one data.

For example, the information may include at least one session Identifier (ID) indicating the selected order of the at least one data. For example, the first controller 110 may generate at least one session ID indicating the selected order of the at least one data. For example, if the at least one data is selected in the sequential order of first, second and third data, the first controller 110 may generate a first session ID corresponding to 001 indicating a first selection for the first data, a second session ID corresponding to 002 indicating a second selection for the second data, and a third session ID corresponding to 003 indicating a third selection for the third data.

The information may include at least one session ID indicating the selected chronological order of the at least one data. For example, the first controller 110 may generate at least one session ID indicating the selected chronological order of the at least one data. For example, if the at least one data is selected in the order of the first, second and third data and the first, second and third data are generated respectively at 09:05, 09:10, and 09:15 on Aug. 15, 2012, the first controller 110 may generate the first, second, and third session IDs respectively including 09:05, 09:10, and 09:15 on Aug. 15, 2012.

The information may further include a device ID identifying a corresponding electronic device. For example, in this case, the device ID identifies the first electronic device 100. The device ID may be a unique ID that identifies the first electronic device 100 during communication. For example, when the second electronic device 200 requests communication to the device ID over a communication network, the second electronic device 200 can transmit data to the first electronic device 100.

According to an exemplary embodiment of the present invention, the information may be metadata of the at least one data. The metadata refers to data describing the at least one data, such as the date and time, writer, main content, type, features, file name, and the like of the at least one data.

According to an exemplary embodiment of the present invention, the information may be, for example, the URL of the at least one data. A URL corresponds to a standardized logical address indicating an actual network path on the Internet. The URL may specify resources on a computer network as well as a Web site address. The URL may be composed of the name and address of a main computer, the position of a directory having the file, and the title of the file.

According to an exemplary embodiment of the present invention, the information may specify, for example, the color of the at least one data. The color of the at least one data corresponds a color in which the at least one data is displayed on the first touch screen 140. The color includes at least one of brightness and chroma that form the color.

The information generated in the above manner may be smaller in size than the at least one data. For instance, if the at least one data corresponds to a video file, information such as a session ID indicating the selected order of the video file has less data than the video file. Advantageously, the information is readily transmitted, compared to transmission of the at least one data.

The first electronic device 100 transmits the information to the data transmission object 300 in step S130.

The first controller 110 of the first electronic device 100 may transmit the information generated in step S120 to the data transmission object 300 by cable or wirelessly. The information may be transmitted to the data transmission object 300 through the first communication module 120. For example, the short-range communication module of the first communication module 120 in the first electronic device 100 may request pairing with the short-range communication module of the third communication module 320 in the data transmission object 300. Then the short-range communication module of the third communication module 320 in the data transmission object 300 may accept the pairing request. The short-range communication modules may operate in conformance to Bluetooth, IrDA, Wi-Fi, or NFC. The first electronic device 100 may transmit the information to the data transmission object 300 through the paired short-range communication module of the first communication module 120. Because the information has a smaller size than the at least one data, the first electronic device 100 can easily transmit the information to the data transmission object 300.

Subsequently, the data transmission object stores the received information in step S140. The third controller 310 of the data transmission object 300 may store the information received from the first electronic device 100 in step S130 in the third memory 330. Because the information may be smaller in size than the at least one data, the information may be readily stored in the third memory 330 of the data transmission object 300.

The data transmission object transmits the information to the second electronic device in step S150.

The third controller 310 of the data transmission object 300 may transmit the information generated in step S120 to the second electronic device 200 by cable or wirelessly. In addition, the third controller 310 of the data transmission object 300 may generate a data transmission object ID identifying the data transmission object 300 and transmit the data transmission object ID in the information to the second electronic device 200. The second controller 210 of the second electronic device 200 may identify the data transmission object 300 using the data transmission object ID. For example, the second controller 210 may determine from the data transmission object ID that the information about the at least one data has been received from the data transmission object 300.

The data transmission object 300 may transmit the information to the second electronic device 200 through the third communication module 320. For example, the short-range communication module of the second communication module 220 in the second electronic device 200 may request pairing with the short-range communication module of the third communication module 320 in the data transmission object 300. Then the third communication module 320 of the data transmission object 300 may accept the pairing request. The short-range communication may be conducted in conformance with at least one of Bluetooth, IrDA, Wi-Fi, NFC, and the like. Then the data transmission object 300 may transmit the information to the second electronic device 200 through the third communication module 320. Because the information may be smaller in size than the at least one data, the data transmission object 300 may be readily transmit the information to the second electronic device 200.

The second electronic device requests transmission of the at least one data to the first electronic device identified by the device ID using the information in step S160.

The second controller 210 of the second electronic device 200 may request transmission of the at least one data by transmitting the information to the first electronic device 100 because the information includes content corresponding to the at least one data in step S120. For example, when the information corresponds to at least one session ID described before in relation to step S120, the at least one session ID may indicate the selected order of the at least one data. Accordingly, the second electronic device 200 may request transmission of the at least one data simply by transmitting the session ID. For instance, the first electronic device 100 may generate a first session ID corresponding to 001 for the first data, a second session ID corresponding to 002 for the second data, and a third session ID corresponding to 003 for the third data. The second electronic device 200 may request transmission of the first, second and third data simply by transmitting the first, second and third sessions IDs to the first electronic device 100.

According to exemplary embodiments of the present invention, intended data may be received by transmitting smaller-sized information about the intended data in this manner. The information may include the data transmission object ID so that the second controller 210 may identify the data transmission object 300 by analyzing the data transmission object ID. The second controller 210 of the second electronic device 200 may determine using the at least one session ID whether the at least one data to be requested is identical to previously received data. If the data are identical, the controller 210 may not request transmission of the at least one data.

Upon detection of the same session ID, the second controller 210 may not transmit the session ID to the first electronic device 100. For example, if the second electronic device 200 has already received data with session IDs 001 and 002 from the data transmission object 300 and the current received session IDs are 001, 002, 003 and 004, the second controller 210 may not request transmission of data having the session IDs 001 and 002 to the first electronic device 100. In accordance with an exemplary embodiment of the present invention, the same data is not requested repeatedly, thereby increasing transmission efficiency. The device ID is, for example, a unique ID identifying the first electronic device 100 on the communication network. Thus, the second electronic device 200 may transmit the information to the first electronic device 100 by requesting communication to the device ID on the communication network. The second controller 210 of the second electronic device 200 may transmit the information to the first electronic device 100 by cable or wirelessly. Specifically, the second controller 210 of the second electronic device 200 may transmit the information to the first electronic device 100 through the second communication module 220. For example, the short-range communication module of the second communication module 220 in the second electronic device 200 may request pairing with the short-range communication module of the first communication module 120 in the first electronic device 100. Then the first communication module 120 in the first electronic device 100 may accept the pairing request. The short-range communication may be conducted in conformance to Bluetooth, IrDA, Wi-Fi, or NFC. Then the second electronic device 200 may transmit the information to the first electronic device 100 through the second communication module 220. Because the information is smaller in size than the at least one data, the second electronic device 200 can readily transmit the information to the first electronic device 100.

Subsequently, the first electronic device transmits at least one data corresponding to the requested at least one session ID directly to the second electronic device in step S170. The first electronic device 100 receives the information from the second electronic device 200 in step S160. The first electronic device 100 may extract the at least one data using the session ID included in the received information because the session ID corresponds to the at least one data and indicates the selected order of the at least one data. For example, the first controller 110 of the first electronic device 100 may generate the first, second and third session IDs 001, 002 and 003 for the first, second and third data, respectively in step S120. Even though the first electronic device 100 receives only the first, second and third session IDs, the controller 110 may extract the at least one data corresponding to the session IDs because the session IDs correspond to the first, second and third data. Therefore, the first controller 110 of the first electronic device 100 may extract the at least one data corresponding to the at least one session ID and transmit the at least one data directly to the second electronic device 200. Because the information may include the data transmission object ID, the first controller 110 may identify the data transmission object 300 by analyzing the data transmission object ID. The first controller 110 of the first electronic device 100 may transmit the at least one data to the second electronic device 200 by cable or wirelessly. Specifically, the first controller 110 of the first electronic device 100 may transmit the at least one data to the second electronic device 200 through the first communication module 120. The short-range communication module of the first communication module 120 may have already been paired in step S170. For example, the paired short-range communication module of the first communication module 120 may operate in conformance to Bluetooth, IrDA, Wi-Fi, or NFC.

FIGS. 4A to 4D are diagrams illustrating an exemplary embodiment of the present invention.

Referring to FIGS. 4A to 4D, at least one data is displayed on the first touch screen 140 of the first electronic device 100. For example, the first electronic device 100 is a portable terminal and the at least one data is an image in FIG. 4A. Referring to FIG. 4B, at least one data is selected from the first touch screen 140 of the first electronic device 100 in step S110. In FIG. 4B, an image 402 is selected as the at least one data. For example, an Eiffel Tower image 402 may be selected by the data transmission object 300 as illustrated in FIG. 4B. For example, upon detection of a touch on or hovering over the image 402 by the data transmission object, the first controller 110 may recognize selection of the image 402. A guideline or edit cursor may be displayed on the image 402 on the first touch screen 140. For instance, a guideline 404 may be drawn around the Eiffel Tower image 402 in FIG. 4B. The guideline 404 may be changed by, for example, a touch or drag made by the data transmission object 300.

Subsequently, the first controller 110 of the first electronic device 100 may generate information about the selected image 402 in step S120. For example, the first controller 110 may generate a session ID 001 indicating the selected order of the image 402. In addition, the first controller 110 may generate, for example, D001 as the device ID of the first electronic device 100.

The first electronic device 100 may transmit the information to the data transmission object 300 as illustrated in FIG. 4B in step S130. Specifically, the first electronic device 100 may transmit the information to the data transmission object 300 through, for example, the short-range communication module of the first communication module 120 in conformance with at least one of Bluetooth, Wi-Fi, NFC, and the like.

The data transmission object 300 may store the received information in the third memory 330 in step S140.

Then the data transmission object 300 may transmit the information to the second electronic device 200 in step S150. Referring to FIG. 4C, the data transmission object 300 may transmit the information 001 and D001 to the second electronic device 200 being a portable terminal. Specifically, the data transmission object 300 may transmit the information to the second electronic device 200 through the short-range communication module of the third communication module 320 in conformance to one of Bluetooth, Wi-Fi, and NFC.

The second electronic device 200 requests transmission of the at least one data to the first electronic device 100 by means of the information in step S160. For example, the second electronic device 200 may request the Eiffel Tower image 402 by transmitting the session ID, 001 to the first electronic device 100 using the device ID, D001 through the second communication module 220 in step S160.

The first electronic device 100 transmits the at least one data corresponding to the at least one session ID directly to the second electronic device 200 in step S170. For example, the first electronic device 100 may transmit the Eiffel Tower image 402 corresponding to the session ID 001 directly to the second electronic device 200 through the first communication module 120. The second electronic device 200 may display the received Eiffel Tower image 402 on the second touch screen 240 as illustrated in FIG. 4D.

FIGS. 5A to 5F are diagrams illustrating an exemplary embodiment of the present invention.

Figure 5A:
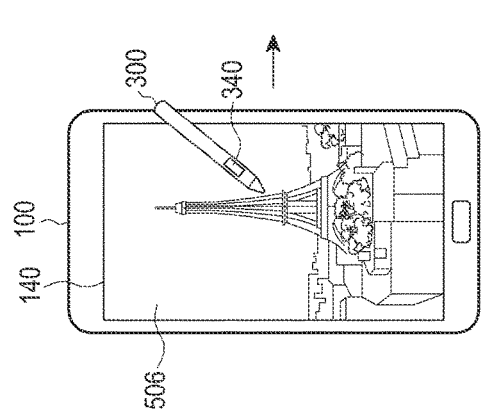
FIGS. 5A, 5B, 5C, 5D, 5E, and 5F are diagrams illustrating an exemplary embodiment of the present invention.
Figure 5B:
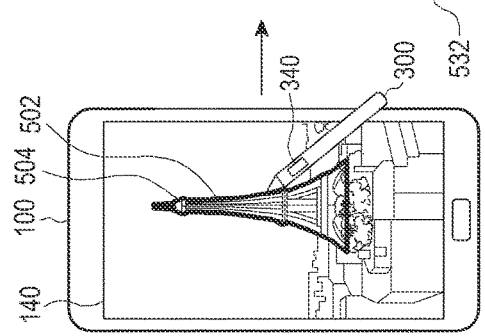

Referring to FIG. 3 and FIG. 5A, at least one data is displayed on the first touch screen 140 of the first electronic device 100. For example, the first electronic device 100 is a portable terminal and the at least one data is an image 506 in FIG. 5A. Referring to FIG. 5B, at least one data is selected from the first touch screen 140 of the first electronic device 100 in step S110. In FIG. 5B, an image 502 is selected as the at least one data. For example, an image of the Eiffel Tower 502 may be selected by the data transmission object 300 as illustrated in FIG. 5B. For example, upon detection of a touch on or hovering over the image 502 by the data transmission object 300, the first controller 110 may recognize selection of the image 502. A guideline or edit cursor may be displayed on the image 502 on the first touch screen 140. For instance, a guideline 504 is drawn around the Eiffel Tower image 502 in FIG. 5B. The guideline 504 may be changed by, for example, a touch or drag made by the data transmission object 300.

Subsequently, the first controller 110 of the first electronic device 100 may generate information about the selected image 502 in step S120. For example, the first controller 110 may generate a session ID 001 indicating the selected order of the image 502. In addition, the first controller 110 may generate, for example, D001 as the device ID of the first electronic device 100. The first controller 110 may store the information and the at least one data in the first memory 130.

Figure 5C:
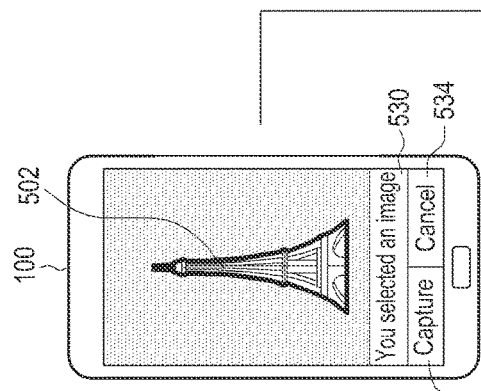
Figure 5D:
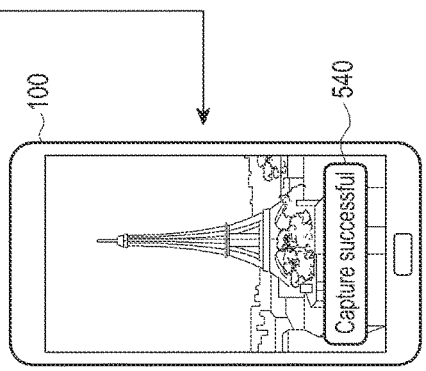

The first electronic device 100 may detect a data capture trigger in step S122. The data transmission object 300 may be, for example, a stylus pen and may include a button 340. The data capture trigger may be generated by pressing the button 340. For example, the first controller 110 of the first electronic device 100 may detect pressing of the button 340 of the data transmission object 300. The first controller 110 may display the selected at least one data, which in this example corresponds to the Eiffel Tower image 502 on the first screen 140, as illustrated in FIG. 5C. The first controller 110 may further display a Capture icon 532 for confirming the capture (selection), a Cancel icon 534 for canceling the selection, and a notification 530 "You selected an image". Upon detection of a touch on the Capture icon 532, the first controller 110 may finally select the image 502. In contrast, upon detection of a touch on the Cancel icon 534, the first controller 110 may cancel the selection of the image 502. If the selection of the image is confirmed, the first controller 110 may display a notification 540 "Capture successful" on the first touch screen 140 as illustrated in FIG. 5D.

Subsequently, the first electronic device 100 may transmit the information to the data transmission object 300 in step S130. Specifically, the first electronic device 100 may transmit the information to the data transmission object 300 through, for example, the short-range communication module of the first communication module 120 in conformance with at least one of Bluetooth, Wi-Fi, NFC, and the like.

The data transmission object 300 may store the received information in the third memory 330 in step S140.

Figure 5E:
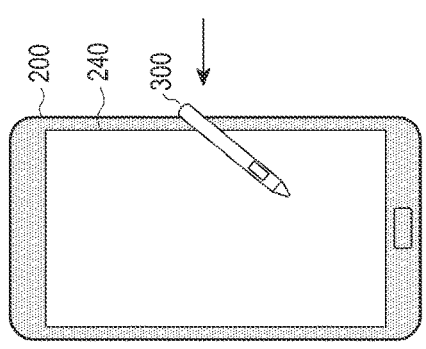

Then the data transmission object 300 may transmit the information to the second electronic device 200 in step S150. Referring to FIG. 5E, the data transmission object 300 may transmit the information 001 and D001 to the second electronic device 200 being a portable terminal. Specifically, the data transmission object 300 may transmit the information to the second electronic device 200 through the short-range communication module of the third communication module 320 in conformance with at least one of Bluetooth, Wi-Fi, NFC, and the like.

The second electronic device 200 requests transmission of the at least one data to the first electronic device 100 by means of the information in step S160. For example, the second electronic device 200 may request the Eiffel Tower image 502 by transmitting the session ID, 001 to the first electronic device 100 using the device ID, D001 through the second communication module 220 in step S160.

Figure 5F:
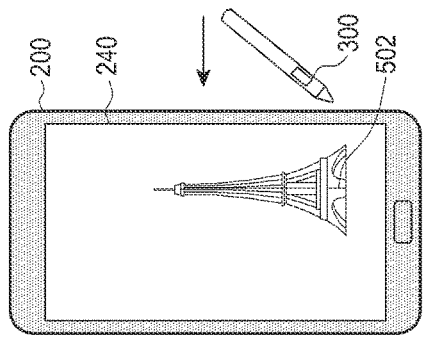

The first electronic device 100 transmits the at least one data corresponding to the at least one session ID directly to the second electronic device 200 in step S170. For example, the first electronic device 100 may transmit the Eiffel Tower image 502 corresponding to the session ID 001 directly to the second electronic device 200 through the first communication module 120. The second electronic device 200 may display the received Eiffel Tower image 502 on the second touch screen 240 as illustrated in FIG. 5F.

FIGS. 6A to 6F are diagrams illustrating an exemplary embodiment of the present invention.

Referring to FIG. 6A, at least one data is displayed on the first touch screen 140 of the first electronic device 100. For example, the first electronic device 100 is a portable terminal and the at least one data is text 606 in FIG. 6A. Referring to FIG. 6B, at least one data is selected from the first touch screen 140 of the first electronic device 100 in step S110. As illustrated in FIG. 6B, text 602 may be selected as the at least one data. That is, upon detection of a touch on or hovering over the text 602 by the data transmission object 300, the first controller 110 may recognize selection of the text 602. A guideline or edit cursor may be displayed on the text 602 on the first touch screen. For example, an edit cursor 604 is marked on the text 602 in FIG. 6B. The edit cursor 604 may be changed by, for example, a touch or drag made by the data transmission object 300.

Subsequently, the first controller 110 of the first electronic device 100 may generate information about the selected text 602 in step S120. For example, the first controller 110 may generate a session ID, 001 indicating the selected order of the text 602. In addition, the first controller 110 may generate, for example, D001 as the device ID of the first electronic device 100.

Then the first electronic device 100 may detect a data capture trigger in step S122. The data transmission object 300 may be, for example, a stylus pen and may include the button 340. The data capture trigger may be generated by pressing the button 340. For example, the first controller 110 of the first electronic device 100 may detect pressing of the button 340 of the data transmission object 300 in FIG. 6B. Then the first controller 110 may display the selected at least one data, that is, the text 602 on the first screen 140, as illustrated in FIG. 6C. The first controller 110 may further display a Capture icon 632 for confirming the capture (selection), a Cancel icon 634 for canceling the selection, and a notification 630 "You selected text". Upon detection of a touch on the Capture icon 632, the first controller 110 may finally select the text 602. In contrast, upon detection of a touch on the Cancel icon 634, the first controller 110 may cancel the selection of the text 602. If the selection of the text 602 is confirmed, the first controller 110 may display a notification 640 "Capture successful" on the first touch screen 140 as illustrated in FIG. 6D.

The first electronic device 100 may then transmit the information to the data transmission object 300 in step S130. Specifically, the first electronic device 100 may transmit the information to the data transmission object 300 through, for example, the short-range communication module of the first communication module 120 in conformance with at least one of Bluetooth, Wi-Fi, NFC, and the like.

The data transmission object 300 may store the received information in the third memory 330 in step S140.

Then the data transmission object 300 may transmit the information to the second electronic device 200 in step S150. Referring to FIG. 6E, the data transmission object 300 may transmit the information 001 and D001 to the second electronic device 200 being a portable terminal. Specifically, the data transmission object 300 may transmit the information to the second electronic device 200 through the short-range communication module of the third communication module 320 in conformance with at least one of Bluetooth, Wi-Fi, NFC, and the like.

The second electronic device 200 requests transmission of the at least one data to the first electronic device 100 by means of the information in step S160. For example, the second electronic device 200 may request the text 602 by transmitting the session ID, 001 to the first electronic device 100 using the device ID, D001 through the second communication module 220 in step S160.

The first electronic device 100 transmits the at least one data corresponding to the at least one session ID directly to the second electronic device 200 in step S170. For example, the first electronic device 100 may transmit the text 602 corresponding to the session ID 001 directly to the second electronic device 200 through the first communication module 120. The second electronic device 200 may display the received text 602 on the second touch screen 240 as illustrated in FIG. 6F.

FIGS. 7A to 7C are diagrams illustrating an exemplary embodiment of the present invention.

Referring to FIG. 7A, the data transmission object 300 transmits at least one data to the second electronic device 200. Referring to FIG. 3, the procedure subsequent to FIG. 7A corresponds to the procedure following step S140 of FIG. 3. Referring to FIG. 7A, the data transmission object 300 transmits information corresponding to the received at least one data to the second electronic device 200. The second electronic device 200 may detect a data transfer trigger in step S142. For example, the second controller 110 of the second electronic device 200 may detect the data transfer trigger in step S142. The data transmission object 300 may include the button 340. The data transfer trigger may be generated by touching or hovering over the second touch screen 240 with the data transmission object 300, while pressing the button 340, and then releasing the button 340. For example, the second controller 210 of the second electronic device 200 may detect a touch of the data transmission object 300 on or hovering over the second touch screen 240, while the button 340 is being pressed and then subsequently, the second electronic device 200 may detect a release of the button 340.

The second electronic device 200 may request transmission of the information to the data transmission object 300 in step S144. For example, the second electronic device 200 may request transmission of the information to the data transmission object 300 through the second communication module 220.

Subsequently, the data transmission object 300 may transmit the requested information to the second electronic device 200 in step S150. For example, the data transmission object 300 may transmit the requested information 001 (e.g., the session ID for the Eiffel Tower image) and D001 (e.g., the device ID) to the second electronic device 200 being a portable terminal. The data transmission object 300 may transmit the information to the second electronic device 200 through the short-range communication module of the third communication module 320 in conformance with at least one of Bluetooth, Wi-Fi, NFC, and the like.

The second electronic device 200 requests transmission of the at least one data to the first electronic device 100 by means of the information in step S160. For example, the second electronic device 200 may request the Eiffel Tower image by transmitting the session ID 001 to the first electronic device 100 using the device ID D001 through the second communication module 220 in step S160.

The first electronic device 100 transmits the at least one data corresponding to the at least one session ID directly to the second electronic device 200 in step S170. For example, the first electronic device 100 may transmit an Eiffel Tower image 702 corresponding to the session ID 001 directly to the second electronic device 200 through the first communication module 120. The second electronic device 200 may display the received Eiffel Tower image 702 on the second touch screen 240 as illustrated in FIG. 7B.

The second controller 220 of the second electronic device 200 may determine whether the received at least one data may be input to an on-going application. Referring to FIG. 7B, the at least one data corresponds to the image 702 and the on-going application corresponds to a memo application. In addition, the at least one data displayed on the second screen 240 can be moved by dragging the at least one data with the data transmission object 300. Therefore, upon detection of a drag 701 of the at least one data made by the data transmission object 300, the second controller 210 of the second electronic device 200 may shift the Eiffel Tower image 702 being the at least one data on the second touch screen 240 as illustrated in FIG. 7B.

If a touch with the data transmission object 300 on or hovering over the second touch screen 240 is not detected, the second controller 210 of the second electronic device 200 may end the data transmission operation.

FIGS. 8A to 8C are diagrams illustrating an exemplary embodiment of the present invention.

Referring to FIG. 8A, the data transmission object 300 transmits at least one data to the second electronic device 200. Referring to FIG. 3, the procedure subsequent to FIG. 8A corresponds to the procedure following step S140 of FIG. 3. Referring to FIG. 8A, the data transmission object 300 transmits information corresponding to the received at least one data to the second electronic device 200. The second electronic device 200 may detect a data transfer trigger in step S142. For example, the second controller 110 of the second electronic device 200 may detect the data transfer trigger in step S142.

The data transmission object 300 may include a button 340. The data transfer trigger may be generated by touching or hovering over the second touch screen 240 with the data transmission object 300, while pressing the button 340, and the subsequent releasing of the button 340. For example, the second controller 210 of the second electronic device 200 may detect a touch on or hovering over the second touch screen 240 with the data transmission object 340, while the button 340 is being pressed and may then detect the release of the button 340 in FIG. 8A.

Then the second electronic device 200 may request transmission of the information to the data transmission object 300 in step S144. For example, the second electronic device 200 may request the information to the data transmission object 300 through the second communication module 220.

Subsequently, the data transmission object 300 may transmit the requested information to the second electronic device 200 in step S150. For example, the data transmission object 300 may transmit the requested information 001 (e.g., a session ID for text) and D001 (e.g., a device ID) to the second electronic device 200 being a portable terminal. The data transmission object 300 may transmit the information to the second electronic device 200 through the short-range communication module of the third communication module 320 in conformance with at least one of Bluetooth, Wi-Fi, NFC, and the like.

The second electronic device 200 requests transmission of the at least one data to the first electronic device 100 by means of the information in step S160. For example, the second electronic device 200 may request transmission of the text by transmitting the session ID 001 to the first electronic device 100 using the device ID D001 through the second communication module 220 in step S160.

The first electronic device 100 transmits the at least one data corresponding to the at least one session ID directly to the second electronic device 200 in step S170. That is, the first electronic device 100 may transmit text 802 corresponding to the session ID 001 directly to the second electronic device 200 through the first communication module 120. The second electronic device 200 may display the received text 802 on the second touch screen 240 as illustrated in FIG. 8B.

The second controller 220 of the second electronic device 200 may determine whether the received at least one data may be input to an on-going application. If the received at least one data may be input to the on-going application, the application may be highlighted on the second touch screen 240. The highlight effect may be exerted by shading or coloring. Referring to FIG. 8B, the at least one data corresponds to the text 802 being a URL and the on-going application is an Internet browser application. The second controller 210 may perform a highlight effect 803 on the application by shading the application after determining that the text 802 being the URL may be input to the Internet browser. The at least one data displayed on the second touch screen 240 may be moved by dragging the at least one data with the data transmission object 300, as illustrated in FIG. 8B. Therefore, upon detection of a drag 801 of the at least one data made by the data transmission object 300, the second controller 210 of the second electronic device 200 may move from a Web page 810 (Web Page A) to a Web page 830 (Web Page B) at a URL to which the text 802 has been shifted on the Internet browser.

If a touch with the data transmission object 300 on or hovering over the second touch screen 240 is not detected, the second controller 210 of the second electronic device 200 may end the data transmission operation. In this case, the highlight effect 803 may be removed, as illustrated in FIG. 8C.

FIGS. 9A to 9C are diagrams illustrating an exemplary embodiment of the present invention.

Referring to FIG. 9A, the data transmission object 300 transmits at least one data to the second electronic device 200. Referring to FIG. 3, the procedure subsequent to FIG. 9A corresponds to the procedure following step S140 of FIG. 3. Referring to FIG. 9A again, the data transmission object 300 transmits information corresponding to the received at least one data to the second electronic device 200. First, the second electronic device 200 may detect a data transfer trigger in step S142. For example, the second controller 110 of the second electronic device 200 may detect the data transfer trigger.

The data transmission object 300 may include the button 340. The data transfer trigger may be generated by touching or hovering over the second touch screen 240 with the data transmission object 300, while pressing the button 340, and thereafter releasing the button 340. For example, the second controller 210 of the second electronic device 200 may detect a touch on or hovering over the second touch screen 240 with the data transmission object 340, while the button 340 is being pressed, and may subsequently detect a release of the button 340 in FIG. 9A.

The second electronic device 200 may request transmission of the information to the data transmission object 300 in step S144. For example, the second electronic device 200 may request the information to the data transmission object 300 through the second communication module 220.

Subsequently, the data transmission object 300 may transmit the requested information to the second electronic device 200 in step S150. For example, the data transmission object 300 may transmit the requested information 001 (e.g., a session ID for an Eiffel Tower image) and D001 (e.g., a device ID) to the second electronic device 200 being a portable terminal. The data transmission object 300 may transmit the information to the second electronic device 200 through the short-range communication module of the third communication module 320 in conformance with at least one of Bluetooth, Wi-Fi, NFC, and the like.

The second electronic device 200 requests transmission of the at least one data to the first electronic device 100 by means of the information in step S160. For example, the second electronic device 200 may request the Eiffel Tower image by transmitting the session ID 001 to the first electronic device 100 using the device ID D001 through the second communication module 220 in step S160.

The first electronic device 100 transmits the at least one data corresponding to the at least one session ID directly to the second electronic device 200 in step S170. For example, the first electronic device 100 may transmit an Eiffel Tower image 902 corresponding to the session ID 001 directly to the second electronic device 200 through the first communication module 120. The second electronic device 200 may display the received Eiffel Tower image 902 on the second touch screen 240 as illustrated in FIG. 9B.

The second controller 220 of the second electronic device 200 may determine whether the received at least one data may be input to an on-going application. If the received at least one data can be input to the on-going application, the application may be highlighted on the second touch screen 240. The highlight effect may be exerted by shading or coloring. The highlight effect may be limited to an area to which the at least one data can be input. For example, referring to FIG. 9B, the at least one data is an image 902 and the on-going application is a memo application. The second controller 210 may perform a highlight effect 903 only on an input area of the memo application by shading the input area of the memo application after determining that the image 902 can be input to the input area of the memo application. In another example, referring to FIG. 8B, the at least one data is the text 802 and the on-going application is the Internet browser application. The second controller 210 may perform the highlight effect 803 only on an address window of the Internet browser application by shading the address window of the Internet browser application after determining that the text 802 being a URL can be input to the address window of the Internet browser application.

In contrast, if the second controller 220 of the second electronic device 200 determines that the at least one data corresponding to the information cannot be input to the on-going application, the second controller 220 may display an application list 930 that can be input on the second touch screen 240, as illustrated in FIG. 9C. The application list 930 may include at least one of an item 940 indicating an application being executed when the at least one data is selected and items 950 indicating applications to which the at least one data can be input. Upon detection of a touch on an item in the application list 930, the second controller 210 may execute an application corresponding to the touched item, input the at least one data to an input area of the application, and display the at least one data in the application on the second touch screen 240.

When the second controller 210 detects pressing of the button 340 in the data transmission object 300, it may also display the application list that can be input.

FIGS. 10A to 10D are diagrams illustrating an exemplary embodiment of the present invention.

Referring to FIG. 10A, the data transmission object 300 transmits at least one data to the second electronic device 200. Referring to FIG. 3, the procedure subsequent to FIG. 10A corresponds to the procedure following step S140 of FIG. 3. Referring to FIG. 10A, the data transmission object 300 transmits information corresponding to the received at least one data to the second electronic device 200. First, the second electronic device 200 may detect a data transfer trigger in step S142. For example, the second controller 110 of the second electronic device 200 may detect the data transfer trigger.

The data transmission object 300 may include the button 340. The data transfer trigger may be generated by touching or hovering over the second touch screen 240 with the data transmission object 300, while pressing the button 340, and thereafter releasing the button 340. For example, the second controller 210 of the second electronic device 200 may detect a touch on or hovering over the second touch screen 240 with the data transmission object 340, while the button 340 is being pressed and may subsequently detect a release of the button 340 in FIG. 10A.

Then the second electronic device 200 may request transmission of the information to the data transmission object 300 in step S144. For example, the second electronic device 200 may request the information to the data transmission object 300 through the second communication module 220.

Subsequently, the data transmission object 300 may transmit the requested information to the second electronic device 200 in step S150. For example, the data transmission object 300 may transmit the requested information 001 (e.g., a session ID for an Eiffel Tower image) and D001 (e.g., a device ID) to the second electronic device 200 being a portable terminal. The data transmission object 300 may transmit the information to the second electronic device 200 through the short-range communication module of the third communication module 320 in conformance with at least one of Bluetooth, Wi-Fi, NFC, and the like.

The second electronic device 200 requests transmission of the at least one data to the first electronic device 100 by means of the information in step S160. For example, the second electronic device 200 may request the Eiffel Tower image by transmitting the session ID, 001 to the first electronic device 100 using the device ID, D001 through the second communication module 220 in step S160.

The first electronic device 100 transmits the at least one data corresponding to the at least one session ID directly to the second electronic device 200 in step S170. For example, the first electronic device 100 may transmit an Eiffel Tower image 1002 corresponding to the session ID 001 directly to the second electronic device 200 through the first communication module 120.

If transmission of the at least one data to the second electronic device 200 takes (or is expected to take) a few or more seconds, the second controller 210 of the second electronic device 200 may display a loading notification 1030 on the second touch screen 240 as illustrated in FIG. 10B.

When transmission of the at least one data to the second electronic device 200 takes (or is expected to take) a few or more seconds, even though a touch with the data transmission object 300 on or hovering over the second touch screen 240 is not maintained, transmission of the at least one data to the second electronic device 200 may be maintained (a first mode). For example, in both cases in which the touch with the data transmission object 300 on or hovering over the second touch screen 240 is and is not maintained, the second controller 210 may maintain the transmission of the at least one data which takes a few or more seconds to reach the second electronic device 200. In the case in which it takes a few or more seconds to transmit the at least one data to the second electronic device 200, the transmission of the at least one data to the second electronic device 200 may be maintained irrespective of whether the touch with the data transmission object 300 on or hovering over the second touch screen 240 is maintained. In addition, the second controller 210 may display a Cancel icon 1035 for discontinuing transmission as illustrated in FIG. 10B. Upon detection of a touch on the Cancel icon 1035, the second controller 210 may discontinue the transmission. Accordingly, when the data transmission takes a few or more seconds, the user may maintain the data transmission without the need for maintaining the touch on or hovering over the second touch screen 240 with the data transmission object 300. If the user wants to cancel the data transmission, the user may touch the Cancel icon 1035 to thereby discontinue the data transmission.

Unlike the first mode, in the case in which transmission of the at least one data to the second electronic device 200 takes a few or more seconds, the second controller 210 may maintain transmission of the at least one data to the second electronic device 200, when the touch with the data transmission object 300 on or hovering over the second touch screen 240 is maintained (a second mode). For example, only when the touch with the data transmission object 300 on or hovering over the second touch screen 240 is maintained, the second controller 210 may maintain the transmission of the at least one data which takes a few or more seconds. In contrast, if the touch with the data transmission object 300 on or hovering over the second touch screen 240 is not maintained, the second controller 210 may discontinue the transmission of the at least one data to the second electronic device 200. Therefore, if the user wants to cancel data transmission that takes a few or more seconds, the user does not maintain the touch on or hovering over the second touch screen 240 with the data transmission object 300.

Upon completion of the transmission of the at least one data, the at least one data displayed on the second touch screen 240 may be shifted by dragging it with the data transmission object 300. For example, upon detection of a drag using the data transmission object 300 of the at least one data, the second controller 210 of the second electronic device 200 may move the Eiffel Tower image 1002 being the at least one data on the second touch screen 240, as illustrated in FIG. 10C. The second controller 210 may display a notification 1040 indicating that the image 1002 can be moved by a drag on the second touch screen 240.

If the touch with the data transmission object 300 on or hovering over the second touch screen 240 is not detected, the second controller 210 may end the data transmission operation. For example, as illustrated in FIG. 10D, if the touch with the data transmission object 300 on or hovering over the second touch screen 240 is not detected, the second controller 210 may end the data transmission operation.

Figure 11:
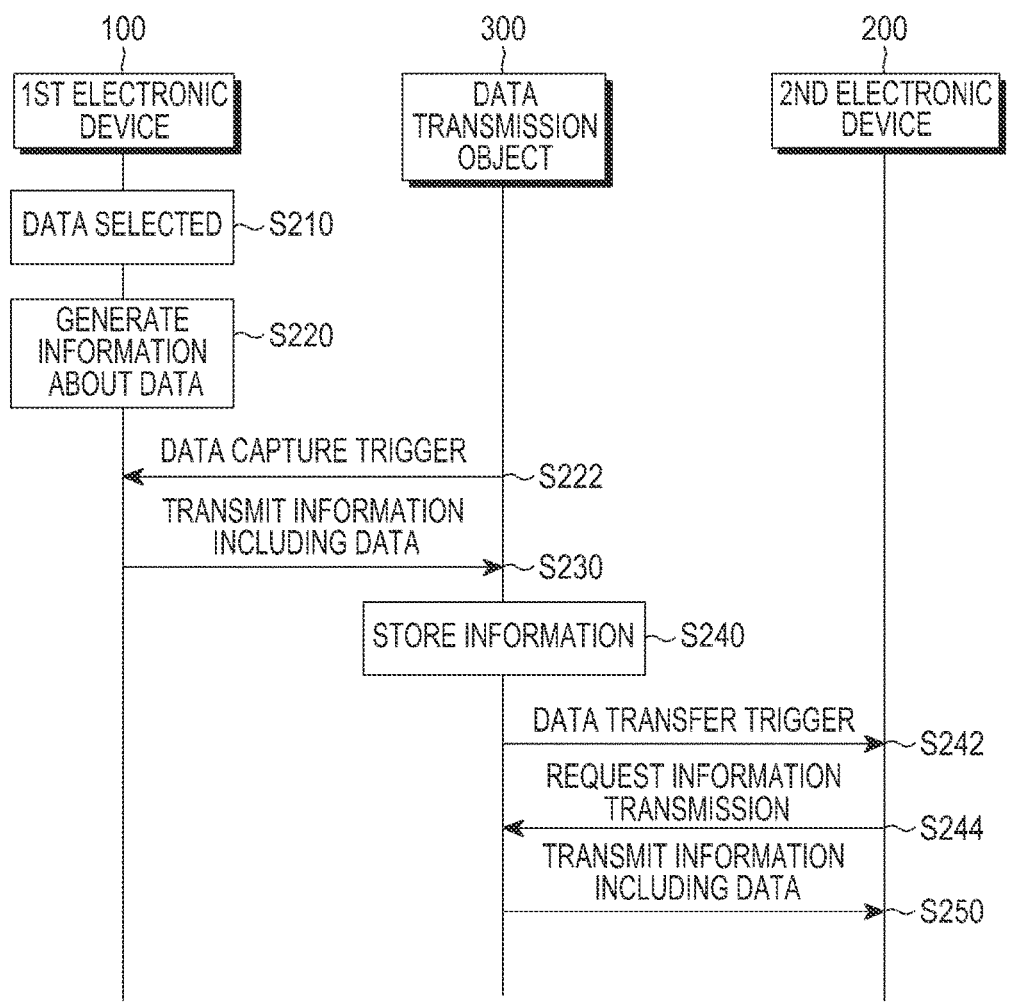
FIG. 11 is a diagram illustrating a signal flow for a data transmission method according to an exemplary embodiment of the present invention.

FIG. 11 is a diagram illustrating a signal flow for a data transmission method according to an exemplary embodiment of the present invention.

Referring to FIG. 11, at least one data is selected from the first touch screen of the first electronic device 100 in step S210. The at least one data may be displayed on the first touch screen 140 of the first electronic device 100.

The at least one data may be any of various types of data that can be displayed on the first touch screen 140. The at least one data may include at least one of an image, text, an audio file, a video file, a URL, a screen shot, a contact, an event, a task, a memo, a note, an application icon, a map view, and the like.

The at least one data may be selected from the first touch screen 140 of the first electronic device 100. For example, the at least data may be selected by touching or hovering over the at least one data. Upon detection of a touch on or hovering over the at least one data made by the user input means (e.g., a user's finger or a stylus pen), the first controller 110 may recognize selection of the at least one data. In addition, upon detection of a touch on or hovering over the at least one data made by the data transmission object 300, the first controller 110 may recognize selection of the at least one data. A guideline or edit cursor may be displayed on the at least one data displayed on the first display unit 140. The guideline or edit cursor may be a mark surrounding the selected at least one data. The size of the guideline or edit cursor may be changed, and as a result, the size of the selected at least one data may be changed. The size of the guideline or edit cursor may be changed by touching or dragging the guideline or edit cursor with the user input means. For example, upon detection of a touch or drag of the guide line or edit cursor made by the user input means, the first controller 110 may change the size of the guideline or edit line according to the touch or drag. The size of the guideline or edit cursor may be changed by touching or dragging the guideline or edit cursor with the data transmission object 300. Upon detection of a touch or drag of the guide line or edit cursor made by the data transmission object 300, the first controller 110 may change the size of the guideline or edit line according to the touch or drag. Subsequently, the first controller 110 may store the selected at least one data in the first memory 130.

The first electronic device generates information about the at least one data in step S220. The first controller 110 of the first electronic device 100 may generate information about the at least one data selected in step S210. The generated information includes content related to the at least one data. The generated information may include the at least one data itself. Accordingly, when the information is transmitted, the at least one data may also be transmitted in the information.

For example, the information may include at least one session ID indicating the selection order of the at least one data. The information may include at least one session ID indicating the selected chronological order of the at least one data. Further, the information may include a device ID identifying the first electronic device 100. The information may be, for example, metadata of the at least one data. The information may be a URL of the at least one data.

Subsequently, the first electronic device may detect a data capture trigger in step S222. The data transmission object 300 may be, for example, a stylus pen. The data transmission object 300 may include the button 340. The data capture trigger may be created by pressing the button 340. For example, the first controller 110 of the first electronic device 100 may detect pressing of the button 340.

Upon detection of the data capture trigger, the first electronic device transmits the information to the data transmission object in step S230. The controller 110 of the first electronic device 100 may transmit the information generated in step S220 to the data transmission object 300 by cable or wirelessly. The information may be transmitted to the data transmission object 300 through the first communication module 120. For example, the short-range communication module of the first communication module 120 in the first electronic device 100 may request pairing with the short-range communication module of the third communication module 320 in the data transmission object 300. Thereafter, the short-range communication module of the third communication module 320 in the data transmission object 300 may accept the pairing request. The short-range communication modules may operate in conformance with at least one of Bluetooth, IrDA, Wi-Fi, NFC, and the like. The first electronic device 100 may transmit the information to the data transmission object 300 through the paired short-range communication module of the first communication module 120.

Subsequently, the data transmission object stores the received information in step S240. The third controller 310 of the data transmission object 300 may store the information received from the first electronic device 100 in step S230 in the third memory 330.

The second electronic device may detect a data transfer trigger in step S242. For example, the second controller 110 of the second electronic device 200 may detect the data transfer trigger. The data transmission object 300 may include the button 340. The data transfer trigger may be generated by touching or hovering over the second touch screen 240 with the data transmission object 300, while pressing the button 340, and then releasing the button 340.

Upon detection of the data transfer trigger, the second electronic device 200 may request transmission of the information to the data transmission object 300 in step S244. For example, the second electronic device 200 may request the information to the data transmission object 300 through the second communication module 220.

The data transmission object transmits the information to the second electronic device in step S250.

The third controller 310 of the data transmission object 300 may transmit the information generated in step S220 to the second electronic device 200 by cable or wirelessly. The data transmission object 300 may transmit the information to the second electronic device 200 through the third communication module 320. For example, the short-range communication module of the second communication module 220 in the second electronic device 200 may request pairing with the short-range communication module of the third communication module 320 in the data transmission object 300. Thereafter, the third communication module 320 in the data transmission object 300 may accept the pairing request. The short-range communication may be conducted in conformance with at least one of Bluetooth, IrDA, Wi-Fi, NFC, and the like. The data transmission object 300 may transmit the information to the second electronic device 200 through the third communication module 320. Because the information includes the at least one data, the second electronic device 200 can receive the at least one data without communicating with the first electronic device 100.

Figures 12A, 12B, 12C:
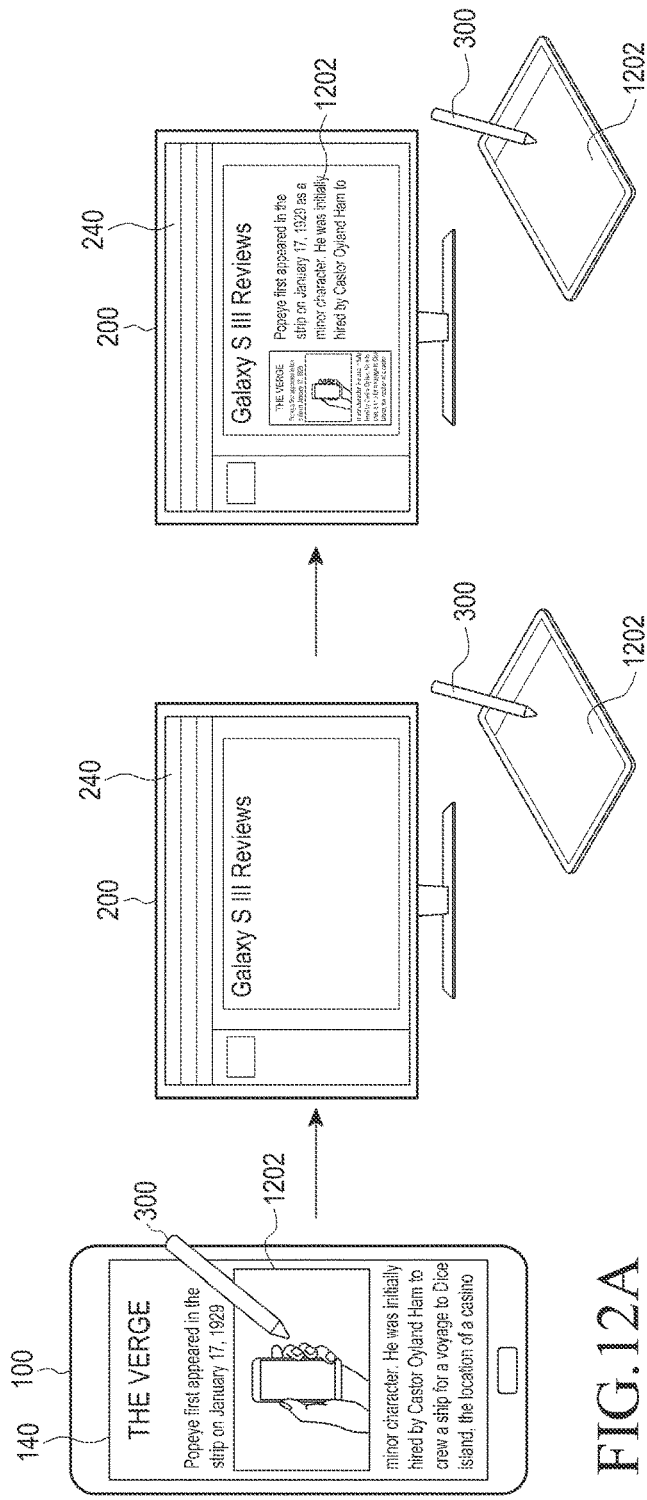
FIGS. 12A, 12B, and 12C are diagrams illustrating a data transmission method according to an exemplary embodiment of the present invention.

FIGS. 12A to 12C are diagrams illustrating a data transmission method according to an exemplary embodiment of the present invention.

In the data transmission method according to an exemplary embodiment of the present invention, an electronic device may be any of a smart phone, a portable phone, a desktop PC, a game console, a TV receiver, a display device, an in-vehicle head unit, a laptop computer, a tablet PC, a PMP, a PDA, and the like.

Referring to FIGS. 12A and 12B, the first electronic device 100 is a portable terminal such as a smart phone or a portable phone, the second electronic device 200 is a desktop PC, and the data transmission object 300 is a stylus pen, by way of example. The second electronic device 200 includes an input unit for sensing the stylus pen. For example, the first electronic device 100 may transmit at least one data 1202 displayed on the first touch screen 140 to the second electronic device 200 through the data transmission object 300 as illustrated in FIG. 12C. The at least one data 1202 may be displayed on the screen 240 of the second electronic device 200. In the data transmission method according to an exemplary embodiment of the present invention, data can be transmitted between heterogeneous electronic devices.

Figure 13:
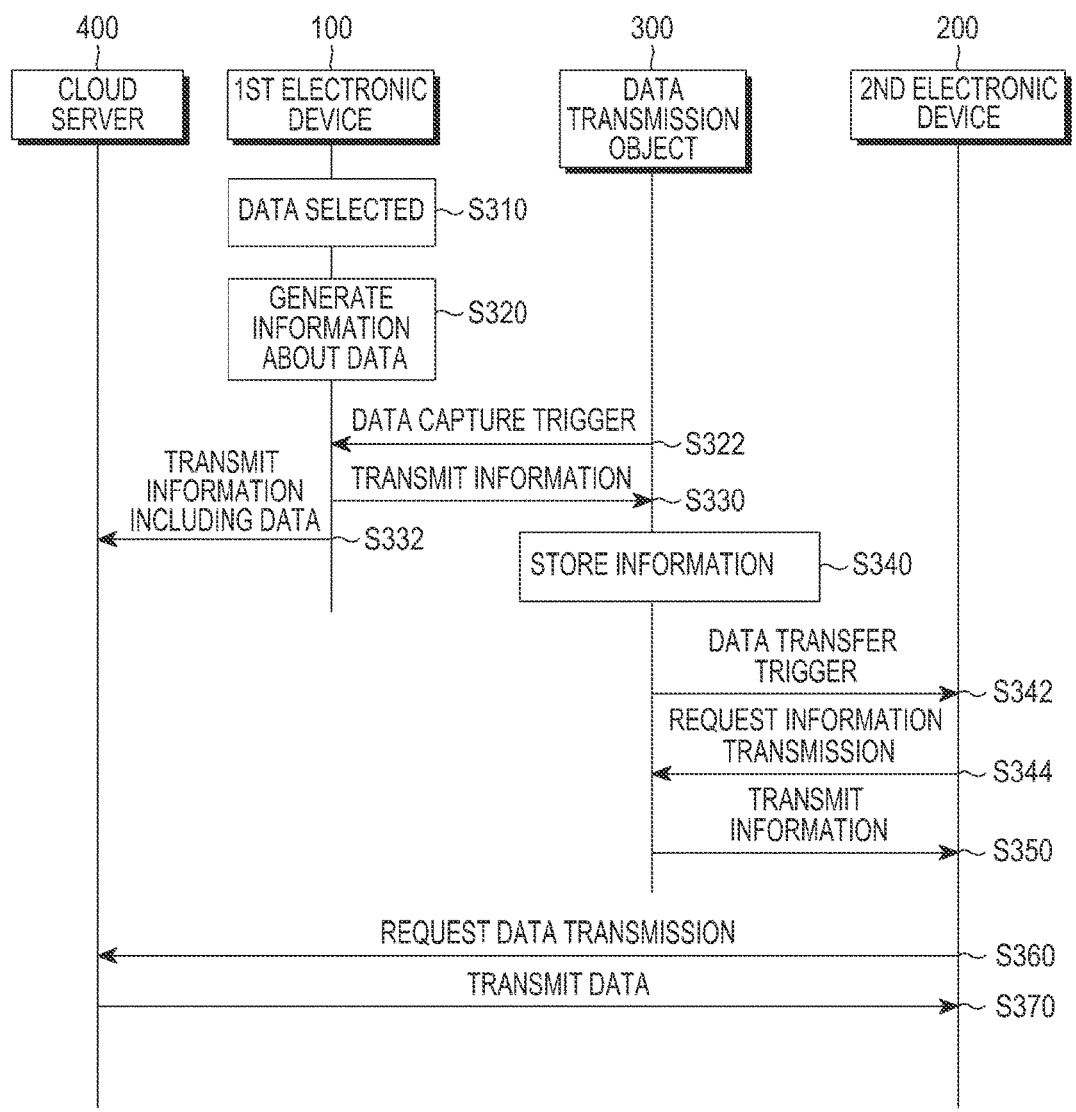
FIG. 13 is a diagram illustrating a signal flow for a data transmission method according to an exemplary embodiment of the present invention.

FIG. 13 is a diagram illustrating a signal flow for a data transmission method according to an exemplary embodiment of the present invention.

Referring to FIG. 13, at least one data is selected from the first touch screen of the first electronic device in step S310. The at least one data may be displayed on the first touch screen 140 of the first electronic device 100. The at least one data may be any of various types of data that can be displayed on the first touch screen 140. The at least one data may include at least one of an image, text, an audio file, a video file, a URL, a screen shot, a contact, an event, a task, a memo, a note, an application icon, a map view, and the like.

The at least one data may be selected from the first touch screen 140 of the first electronic device 100. For example, the at least data may be selected by touching or hovering over the at least one data. Upon detection of a touch on or hovering over the at least one data made by the user input means (e.g., a user's finger or a stylus pen), the first controller 110 may recognize selection of the at least one data. In addition, upon detection of a touch on or hovering over the at least one data made by the data transmission object 300, the first controller 110 may recognize selection of the at least one data.

The first electronic device generates information about the at least one data in step S320. The first controller 110 of the first electronic device 100 may generate information about the at least one data selected in step S310. The generated information may include content related to the at least one data. The generated information may be smaller in size than the at least one data.

The information may include at least one session ID indicating the selected chronological order of the at least one data. The information may be, for example, metadata of the at least one data. The information may be a URL of the at least one data. The information may be the color of the at least one data.

Subsequently, the first electronic device 100 may detect a data capture trigger in step S322. The data transmission object 300 may be, for example, a stylus pen. The data transmission object 300 may include the button 340. The data capture trigger may be created by pressing the button 340.

Upon detection of the data capture trigger, the first electronic device transmits the information to the data transmission object in step S330. The controller 110 of the first electronic device 100 may transmit the information generated in step S320 to the data transmission object 300 by cable or wirelessly. The information may be transmitted to the data transmission object 300 through the first communication module 120. The first electronic device also transmits the at least one data in the information to a cloud server 400 in step S332. The first controller 110 of the first electronic device 100 may include the at least one data in the information generated in step S320 and transmits the information to the cloud server 400 by cable or wirelessly. Specifically, the first controller 110 of the first electronic device 100 may transmit the information including the at least one data to the cloud server 400 through the first communication module 120.

Subsequently, the data transmission object stores the received information in step S340. The third controller 310 of the data transmission object 300 may store the information received from the first electronic device 100 in step S330 in the third memory 330. Because the information is smaller in size than the at least one data, the information is readily stored in the third memory 330 of the data transmission object 300.

The second electronic device 200 may detect a data transfer trigger in step S342. For example, the second controller 110 of the second electronic device 200 may detect the data transfer trigger. The data transmission object 300 may include the button 340. The data transfer trigger may be generated by touching or hovering over the second touch screen 240 with the data transmission object 300, while pressing the button 340, and thereafter releasing the button 340.

Upon detection of the data transfer trigger, the second electronic device 200 may request transmission of the information to the data transmission object 300 in step S344. For example, the second electronic device 200 may request transmission of the information to the data transmission object 300 through the second communication module 220.

The data transmission object transmits the information to the second electronic device in step S350. The third controller 310 of the data transmission object 300 may transmit the information generated in step S320 to the second electronic device 200 by cable or wirelessly. In addition, the third controller 310 of the data transmission object 300 may generate a data transmission object ID identifying the data transmission object 300 in the information and transmit the information to the second electronic device 200. The data transmission object 300 may transmit the information to the second electronic device 200 through the third communication module 320.

The second electronic device requests transmission of the at least one data to the cloud server 400 by means of the information in step S360. The second controller 210 of the second electronic device 200 may receive the at least one data by transmitting the information about the at least one data to the cloud server 400 by cable or wirelessly because the information includes the content corresponding to the at least one data in step S320.

The cloud server 400 transmits the requested at least one data to the second electronic device in step S370. The cloud server 400 receives the information from the second electronic device 200 in step S360. Then the cloud server 400 may extract the at least one data from the information using a session ID included in the information because the session ID generated in step S320 indicates the selected order of the at least one data. Because the information may also include the data transmission object ID, the cloud server 400 may identify the data transmission object 300 that has transmitted the information and thus extract the at least one data. Then the cloud server 400 transmits the extracted at least one data to the second electronic device 200 by cable or wirelessly.

As is apparent from the above description of exemplary embodiments of the present invention, data may be transmitted between electronic devices using a data transmission object.

Data of a large size can be transmitted simply by transmitting information of a small size.

User convenience is increased in data transmission by means of a data transmission object and the touch screens of electronic devices.

It will be understood that exemplary embodiments of the present invention may be implemented in hardware, software, or a combination thereof. The software may be stored in a volatile or non-volatile memory device like a ROM irrespective of whether data is deletable or rewritable, in a memory like a RAM, a memory chip, a device, or an integrated circuit, or in a storage medium to which data can be recorded optically or magnetically and from which data can be read by a machine (e.g., a computer), such as a compact disc (CD), a digital video disc (DVD), a magnetic disk, or a magnetic tape. Further, exemplary embodiments of the present invention can be implemented in a computer or portable terminal that has a controller and a memory, and the memory is an example of a machine-readable storage medium suitable for storing a program or programs including commands to implement exemplary embodiments of the present invention. The memory may include a non-transitory storage medium on which the programs are stored. Accordingly, exemplary embodiments of the present invention include a program having a code for implementing the apparatuses or methods defined by the claims and a non-transitory storage medium readable by a machine that stores the program. The program may be transferred electronically through a medium such as a communication signal transmitted via a wired or wireless connection, which and the equivalents of which are included in exemplary embodiments the present invention.

A mobile device may receive the program from a program providing device connected by cable or wirelessly and store the program. The program providing device may include a program including commands to implement exemplary embodiments of the present invention, a memory for storing information required for exemplary embodiments of the present invention, a communication module for communicating with the mobile device by cable or wirelessly, and a controller for transmitting the program to the mobile device automatically or upon request of the mobile device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting data by a first electronic device, the method comprising:
   displaying, on a first touch screen of the first electronic device, a first image comprising a plurality of objects;
   receiving, through the first touch screen, a plurality of touch inputs generated by a stylus pen on each of the plurality of objects displayed on the first touch screen, respectively;
   in response to receiving the plurality of touch inputs, generating a plurality of pieces of information for the plurality of objects respectively, each of the plurality of pieces of information including a session identifier for a corresponding object of the plurality of objects;
   transmitting, to the stylus pen, the plurality of pieces of information to be transmitted from the stylus pen to a second electronic device, wherein the plurality of pieces of information comprise a plurality of session identifiers;
   receiving, directly from the second electronic device, a request message including at least one session identifier that is selected by the second electronic device among the plurality of session identifiers; and
   transmitting, directly to the second electronic device, a second image to be displayed on a second touch screen of the second electronic device, wherein the second image comprises at least one object corresponding to the at least one session identifier among the plurality of objects based on the request message.

2. The method of claim 1, wherein the transmitting of the second image comprises:
   directly transmitting the at least one object corresponding to the at least one session identifier to the second electronic device by the first electronic device.

3. The method of claim 2, wherein an on-going application on the second electronic device is displayed to be highlighted on the second touch screen of the second electronic device when the at least one object corresponding to the plurality of pieces of information can be input to the on-going application.

4. The method of claim 2, wherein a list of applications to which the at least one object can be input is displayed on the second touch screen of the second electronic device when the at least one object corresponding to the received information cannot be input to an on-going application on the second electronic device.

5. The method of claim 1, wherein the transmitting of the plurality of pieces of information comprises:
   based on detecting an object capture trigger, transmitting the plurality of pieces of information to the stylus pen.

6. The method of claim 5,
   wherein the stylus pen includes a button, and
   wherein the object capture trigger is created by pressing the button.

7. The method of claim 1, wherein the request message is received from the second electronic device based on an object transfer trigger being detected on the second electronic device.

8. The method of claim 7,
wherein the stylus pen includes a button, and
wherein the object transfer trigger is detected when a touch or a hover by the stylus pen is detected on the second touch screen of the second electronic device with the button pressed.

9. The method of claim 1, further comprising:
transmitting information including the at least one object to a cloud server;
wherein based on transmission of the at least one object being requested by the second electronic device, the at least one object is transmitted from the cloud server to the second electronic device.

10. An electronic device comprising:
a first touch screen; and
a controller configured to:
  display, on the first touch screen, a first image comprising a plurality of objects,
  receive, through the first touch screen, a plurality of touch inputs generated by a stylus pen on each of the plurality of objects displayed on the first touch screen, respectively,
  in response to receiving the plurality of touch inputs, generate a plurality of pieces of information for the plurality of objects respectively, each of the plurality of pieces of information including a session identifier for a corresponding object of the plurality of objects,
  transmit, to the stylus pen, the plurality of pieces of information to be transmitted from the stylus pen to an external electronic device, wherein the plurality of pieces of information comprise a plurality of session identifiers,
  receive, directly from the external electronic device, a request message including at least one session identifier that is selected by the external electronic device among the plurality of session identifiers, and
  transmit, directly to the external electronic device, a second image to be displayed on a second touch screen of the external electronic device, wherein the second image comprises at least one object corresponding to the at least one session identifier among the plurality of objects based on the request message.

11. The electronic device of claim 10, wherein the controller is further configured to detect an object capture trigger which is created by pressing a button of the stylus pen.

12. The electronic device of claim 11, wherein the object capture trigger is detected when a touch or a hover by the stylus pen is inputted on the first touch screen, with the button pressed, and then the button is subsequently released.

13. The electronic device of claim 10, wherein an on-going application on the external electronic device is displayed to be highlighted on the second touch screen of the external electronic device when the at least one object corresponding to the plurality of pieces of information can be input to the on-going application.

14. The electronic device of claim 10, wherein a list of application to which the least one object can be input is displayed on the second touch screen of the external electronic device when the at least one object corresponding to the information cannot be input to an on-going application on the external electronic device.

* * * * *